United States Patent [19]
Ichikawa et al.

[11] Patent Number: 5,886,654
[45] Date of Patent: Mar. 23, 1999

[54] APPARATUS AND METHOD FOR DECODING DATA USING FLAGS TO INDICATE DECODING ERRORS IN DATA ROWS AND COLUMNS

[75] Inventors: Takahiro Ichikawa, Saitama; Kazuhiro Yasuda; Tadashi Nakata, both of Kanagawa; Shigeharu Sato, Chiba, all of Japan

[73] Assignee: Sony Corporation, Tokyo, Japan

[21] Appl. No.: 901,290

[22] Filed: Jul. 31, 1997

[30] Foreign Application Priority Data

Aug. 13, 1996 [JP] Japan .................................. 8-213492

[51] Int. Cl.⁶ ................................................. H03M 13/00
[52] U.S. Cl. ............................................................. 341/94
[58] Field of Search ................................ 341/94; 371/37.4, 371/37.9

[56] References Cited

U.S. PATENT DOCUMENTS 5,745,506  4/1998  Yamashita et al. .................... 371/37.9

*Primary Examiner*—Brian Young
*Attorney, Agent, or Firm*—Frommer Lawrence & Haug, LLP.; William S. Frommer

[57] ABSTRACT

Decoding apparatus and method set interpolation flags in units smaller than an ECC block. The PI1 flag indicating an error on a row-by-row basis is generated for the first error correction result, while the PI2 flag also indicating an error on a row-by-row basis is generated for the second error correction result in the ECC block. The PO flag indicating an error on a column-by-column basis is further generated for the error correction result in the ECC block. Following these processing operations, the PI1, PI2 and PO flags are used for generating the interpolation flags.

10 Claims, 37 Drawing Sheets

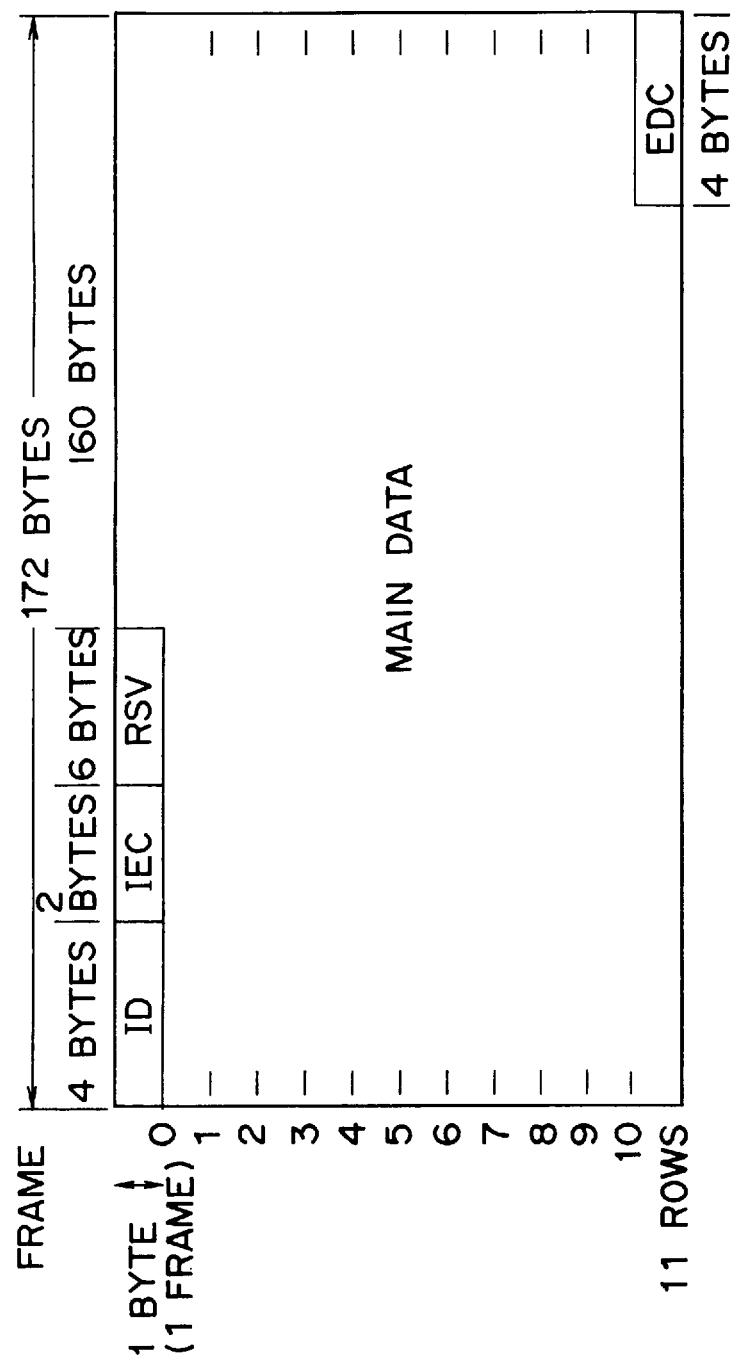
F I G. 4

PO CORRECTION SEQUENCE →

PI CORRECTION SEQUENCE →

STORAGE FORMAT IN THE RAM 37

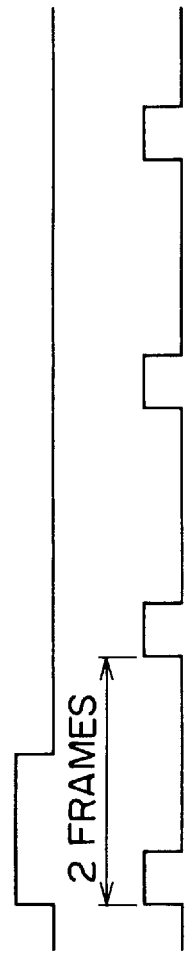
FIG. 6A SCSY
FIG. 6B MAIN-FMSY
FIG. 6C SUB
FIG. 6D MWEN
FIG. 6E EFM+W FRAME
FIG. 6F P11 FRAME
WRITING OUTPUT OF THE EFM + DEMODULATING CIRCUIT TO THE RAM 37

FIG. 13

| BIT7 | SET INTERPOLATION FLAG GENERATING MODE |
|---|---|
| BIT6 | ECC BLOCK (1 : START SECTOR) |
| BIT5 | DETECT START SECTOR (1 : DETECTED) |
| BIT4 | DETECT END SECTOR (1 : DETECTED) |
| BIT3 | DESCRAMBLE INITIALIZING ADDRESS (BIT 3) |
| BIT2 | DESCRAMBLE INITIALIZING ADDRESS (BIT 2) |
| BIT1 | DESCRAMBLE INITIALIZING ADDRESS (BIT 1) |
| BIT0 | DESCRAMBLE INITIALIZING ADDRESS (BIT 0) |

SECTOR INFORMATION (SI)

F I G. 16
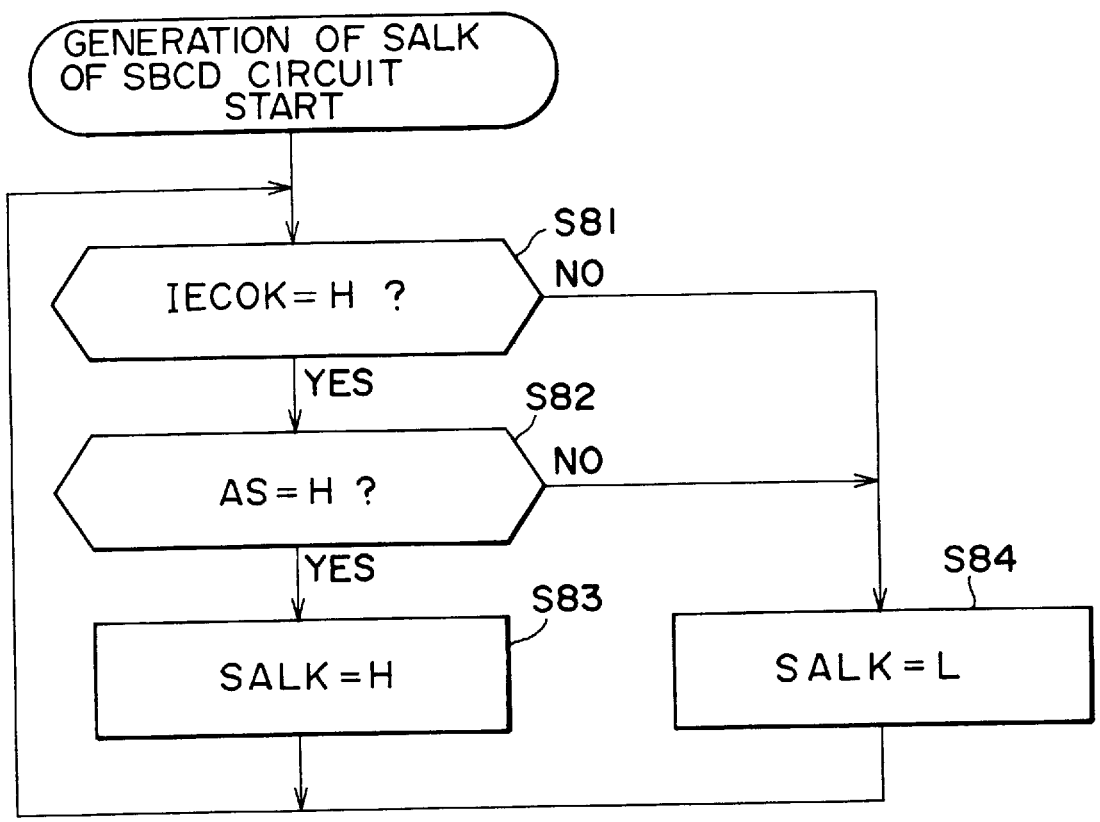

F I G. 21

| |
|---|
| BIT7 UNCORRECTABLE (1: UNCORRECTABLE) |
| BIT6 PO (0: PI/1: PO) |
| BIT5 PI2 (0: PI/1: PI2) |
| BIT4 CORRECTION COUNT (PLACE OF $2^4$) |
| BIT3 CORRECTION COUNT (PLACE OF $2^3$) |
| BIT2 CORRECTION COUNT (PLACE OF $2^2$) |
| BIT1 CORRECTION COUNT (PLACE OF $2^1$) |
| BIT0 CORRECTION COUNT (PLACE OF $2^0$) |

ERROR CORRECTION RESULT ER

FIG. 22A EFMREQ
FIG. 22B OUTREQ
FIG. 22C ECCREQ H
FIG. 22D EFMACK
FIG. 22E OUTACK
FIG. 22F ECCACK
FIG. 22G C11M

BUS ARBITRATION FOR ACCESSING RAM 37

FIG. 23

THE NUMBER OF TIMES RAM IS ACCESSED IN ONE ECC BLOCK (WHEN EXECUTED UP TO PI1-PO-PI2 WITH ECC EXECUTION CYCLE LENGTH FIXED TO 208 BYTES)

| | |
|---|---|
| (EFM WRITE)<br>EFM+DEMODULATED DATA WRITE | 182       × 208 =37856 |
| (PI1 SERIES)<br>PI SERIES READ<br>PI SERIES ERROR CORRECTION<br>PI SERIES ERROR CORRECTION RESULT WRITE | 208        × 208 =43264<br>(10+10)  × 208 = 4160<br>1            × 208 =   208 |
| (PO SERIES)<br>PO SERIES READ<br>PO SERIES ERROR CORRECTION<br>PO SERIES ERROR CORRECTION WRITE | 208        × 172 =35776<br>(16+16)  × 172 = 5504<br>1            × 172 =   172 |
| (PI2 SERIES)<br>PI SERIES READ<br>PI SERIES ERROR CORRECTION<br>PI SERIES ERROR RESULT WRITE | 208        × 208 =43264<br>(10+10)  × 208 = 4160<br>1            × 208 =   208 |
| (ID SERIES)<br>ID SERIES READ<br>SECTOR INFORMATION WRITE | 6            × 208 = 1248<br>1            × 208 =   208 |
| (ID USER DATA OUT)<br>SECTOR INFORMATION READ<br>CORRECTION RESULT INFORMATION READ<br>PI SERIES READ | 1            × 208 =   208<br>3            × 208 =   624<br>182        × 208 =37856 |
| 1 ECC BLOCK TOTAL | 1074                    214716 |
| 1 MAIN FRAME AVERAGE | 215132/208 = 1033 |

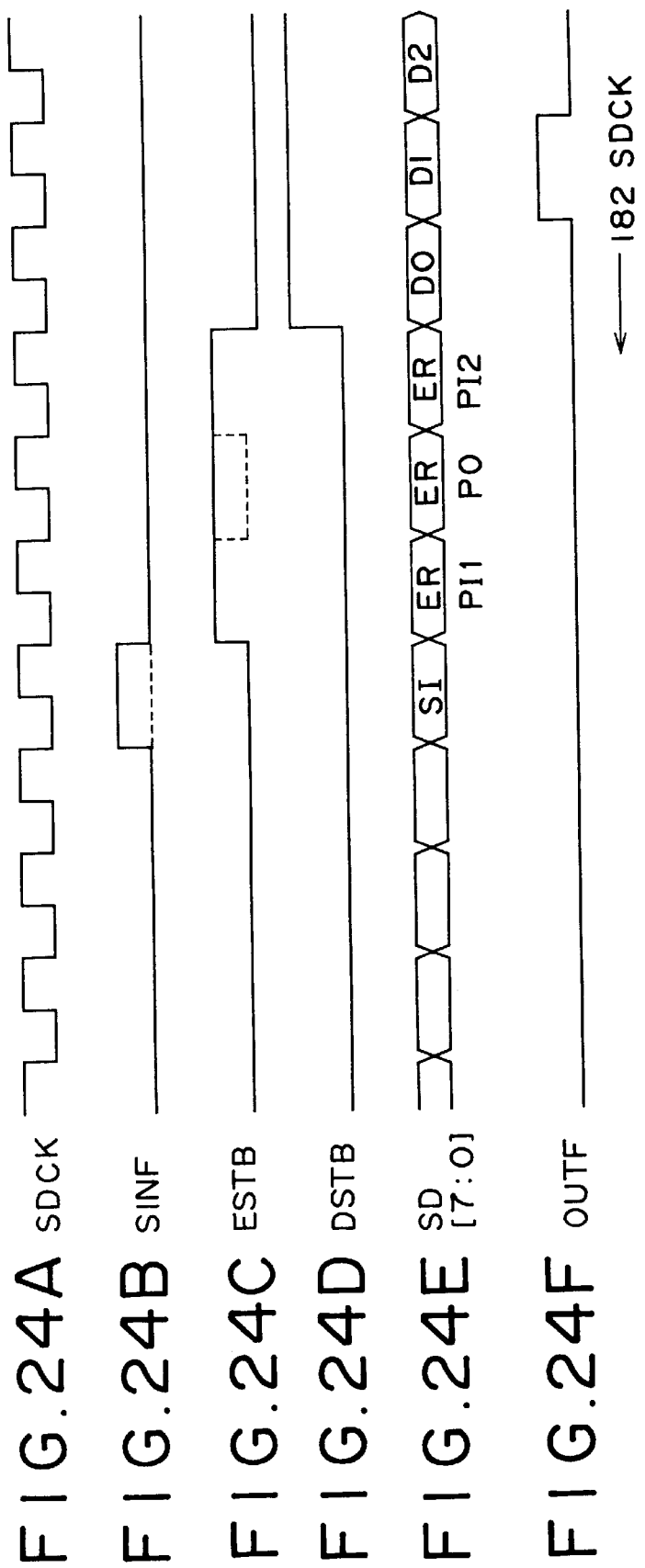

FIG. 28

INPUT: ERROR (FLAG INPUT) = LOW (ORDINARY CORRECTION)
= PO FLAG (ERASURE CORRECTION)

P = 10
PCYC = 16
X = Y = T = 10 ( → 8)

OUTPUT:

| O.CODEERR | O.YOVER | CORRECTION EXECUTED | PI FLAG | |
|---|---|---|---|---|
| L | L | ○ | L | |
| H | L | × | H | (ERRONEOUS CORRECTION DETECTED) |
| H | H | × | H | (UNCORRECTABLE) |

EXAMPLE OF ERROR CORRECTION MODE SETTING AND CORRECTING OPERATION (PI)

FIG. 29

INPUT: ERROR (FLAG INPUT)  PI1 FLAG (ERASURE CORRECTION)

P = 16
PCYC = 16
X = Y = T = 16 ( → 14 )

OUTPUT:

| O CODEERR | O YOVER | CORRECTION EXECUTED | PO FLAG | |
|---|---|---|---|---|
| L | L | ○ | L | |
| H | L | × | H | (ERRONEOUS CORRECTION DETECTED) |
| H | H | × | H | (UNCORRECTABLE) |

EXAMPLE OF ERROR CORRECTION MODE SETTING AND CORRECTING OPERATION (PO)

FIG. 30

[INTERPOLATION FLAG GENERATING MODE]

[1] PO FLAG • PI2 FLAG CONJUNCTION(AND) FIXED

[1] PO FLAG # PI2 FLAG DISJUNCTION(OR) FIXED

[3] [1] OR [2] IS SELECTED ACCORDING TO ERRONEOUS CORRECTION OR NO ERRONEOUS CORRECTION IN PI2 CORRECTION

| PI1 CORRECTION | PO CORRECTION | PI2 CORRECTION | PO FLAG ? PI2 FLAG |
|---|---|---|---|
| — | — | ERRONEOUS CORRECTION NOT DETECTED | CONJUNCTION (AND) |
| — | — | ERRONEOUS CORRECTION DETECTED | DISJUNCTION (OR) |

ECC BLOK

APPARATUS AND METHOD FOR DECODING DATA USING FLAGS TO INDICATE DECODING ERRORS IN DATA ROWS AND COLUMNS

BACKGROUND OF THE INVENTION

The present invention relates to decoding apparatus and method and, more particularly, to decoding apparatus and method for performing error correction processing on data that is subject to decoding in a direction of data rows and columns, such that error flags are generated to indicate decoding errors in data rows and columns based on the error correction processing.

Information reproduced via a light beam in an optical disc reproducing apparatus may have a read error caused by a scratch on the disc, for example. Error correction processing thus should be performed on the reproduced information.

FIG. 33 shows a representative optical disc reproducing apparatus. An optical disc 1 stores data, such as images and sounds, for example. An optical pickup 2 reads the information stored on the optical disc 1 using a laser beam. The reproduced signal outputted from the pickup 2 is demodulated by a demodulating circuit 3 and is supplied to a sector detecting circuit 4 for detecting a sector based on the reproduced signal. If a sector number assigned to a sector on the optical disc 1 is not detected, a sector number error signal is generated by the sector detecting circuit 4 for input to a track jump discriminating circuit 18.

An ECC (Error Correction Code) circuit 5 performs error detection and error correction on the reproduced signal received from the sector detecting circuit 4. If an unrecoverable error occurs, the ECC circuit 5 outputs an unrecoverable error signal to the track jump discriminating circuit 18. Otherwise, error-corrected data is then transmitted from the ECC circuit 5 to a ring buffer memory 7 to be stored therein.

Based on the output of the sector detecting circuit 4, a ring buffer controlling circuit 6 reads an address for each sector and designates a write address (via a write pointer WP) corresponding to the read address in the ring buffer memory 7. If a code request signal from a multiplexed data separating circuit 8 is received, the ring buffer controlling circuit 6 specifies the read address (via a read pointer RP) of the data previously written to the ring buffer memory 7, reads the data based on the read pointer RP, and supplies the read data to the multiplexed data separating circuit 8.

A header separating circuit 9 separates a pack header and a packet header from the data and supplies the separated pack header and packet header to a separator control circuit 11. According to a stream ID (stream identifier) of the packet header, the separator control circuit 11 separates time-division-multiplexed video code data from audio code data by sequentially switching an input terminal G between output terminals H1 and H2 in a switching circuit 10. The separated data is then supplied to a corresponding code buffer 13 or 15.

The video code buffer 13 generates a code request to the multiplexed data separating circuit 8 based on the data remaining in the buffer. Also, the video code buffer 13 stores the data supplied from the multiplexed data separating circuit 8 and receives a code request from a video decoding apparatus 14. The video decoding apparatus 14 decodes the video data for reproducing a video signal, such that the decoded video signal can be output from an output terminal 91.

Similarly, the audio code buffer 15 supplies a code request to the multiplexed data separating circuit 8, and stores the data supplied from separating circuit 8. In addition, the audio code buffer 15 receives a code request from an audio decoding apparatus 16. The audio decoding apparatus decodes the audio data for reproducing an audio signal and outputs the decoded audio signal from an output terminal 92.

Thus, the video and audio data are appropriately supplied from the corresponding circuits of the preceding stage via a transfer request from the corresponding circuits of the subsequent stage. For example, the video decoding apparatus 14 requests the video code buffer 13 for the data transfer, and the multiplexed data separating circuit 8 requests the ring buffer control circuit 6 for the data transfer. The requested data is transferred from the ring buffer memory 7 to the video decoding apparatus 14 in the direction reverse to the direction in which the transfer requests have been made.

Next, the recorded data format will be described. In the following example, data is recorded in units of a cluster (32K bytes). A representative cluster configuration is described below in detail.

Data of 2K bytes (2048 bytes) is extracted for one cluster, to which an overhead consisting of 16 bytes is added for a total of 2064 bytes, as shown in FIG. 34. Among other things, the overhead includes a sector address and an error detection code (EDC).

The sector data of 2064 bytes is arranged as 12 by 172 bytes. As shown in FIG. 35, sixteen sectors are accumulated to provide 192 by 172 bytes in a row by column configuration. Then, an outer parity (PO) of 16 bytes in the vertical direction is added to every column, and an inner parity (PI) of 10 bytes in the horizontal direction is added to every row. This results in a block of data 208 (that is, 192+16) by 182 (that is, 172+10) bytes, as shown in FIG. 35.

The outer parity section of 16 by 182 bytes is divided into 16 rows of 1 by 182 bytes each. The 16 rows are then interleaved among the 16 sectors (0 through 15) of 12 by 182 bytes each, as shown in FIG. 36. The data arranged as 13 (that is, 12+1) by 182 bytes comprises one sector.

The data of 208 by 182 bytes (as shown in FIG. 36) is split into two frames resulting in a 91-byte frame, as shown in FIG. 37. At the beginning of the frame, a frame sync signal (FS) of 2 bytes is added. Consequently, as shown in FIG. 37, one frame contains 93 bytes in the horizontal direction, resulting in a data block of 208 by (93×2) bytes which is one cluster (that is, one ECC block). The size of the actual data that is obtained by removing the overhead part is 32K bytes (that is, 2048×16/1024K bytes). The entire data is recorded on the optical disc 1 on a cluster-by-cluster basis.

Next is described the operation for generating an interpolation flag for interpolating error data following the data error correction in the example of FIG. 33.

FIG. 38 is a flowchart illustrating the processing operation when the ECC circuit 5 performs a first correction along the row (horizontal) direction using the inner parity PI (this correction operation is hereinafter referred to as PI1 correction), then performs another correction along the column (vertical) direction using the outer parity PO (this correction operation is hereinafter referred to as PO correction), and finally performs a third correction using the inner parity PI (this correction operation is hereinafter referred to as PI2 correction).

According to this processing, an ECC block is checked for an unrecoverable error following the PI1 correction in step S1. If no unrecoverable error is found, the process goes to step S4; if an unrecoverable error is found, the process goes to step S2.

In step S2, it is determined whether the optical disc has to be re-read (data reproduced again). Namely, it is determined whether:

(1) the ECC block having the unrecoverable error is to be read again from the optical disc 1; or (2) an interpolation flag is to be added to the ECC data block, and the resultant data is to be outputted.

If option (1) is selected, the process goes to step S3, where the optical disc 1 is read again. The process then returns to step S1. In option (2), the interpolation flag (that is, the flag indicating that interpolation is required) is added to the data of that block, and step S4 is carried out next.

In step S4, it is determined whether the result of the sector EDC check (the check using the error detection code inserted in each sector as described with reference to FIG. 34) is normal or not. Namely, each sector is checked for an error. If the result is found normal (that is, the sector has no error), the process continues with step S7, and the data is outputted without any change. If the result of the sector EDC check is found abnormal (that is, the sector has an error), step S5 is performed.

In step S5, it is determined whether the optical disc 1 is to be read again or not. Namely, it is determined whether:

(1) the failed sector is to be read again from the optical disc 1; or (2) an interpolation flag is to be added to the failed data sector, and the resultant data is to be outputted.

If option (1) is selected, the process goes to step S6, in which case the failed sector is read again from the optical disc 1. Then, the process returns to step S1. In option (2), an interpolation flag is added to the data of that sector, and the process continues with step S7. In step S7, the processed data (in this case, the data with the interpolation flag) is outputted, upon which the processing is ended.

In the above-mentioned example, if the ECC circuit 5 detects data having an unrecoverable error, the interpolation flag is added to all of the data in that block. Each unit of data constituting the ECC block is 8 bits (1 byte) long, and the interpolation flag is 1 bit long. Therefore, the length of the data combined with the interpolation flag is 9 bits. Storing the 9-bit data requires a memory device that stores data on a 9-bit basis. Such a memory device, however, is not generally available and is, therefore, costlier than generally available memory devices, thereby posing a problem of increased fabrication cost for the decoding apparatus.

Further, if the ECC decoding is performed using a preselected length data serving as a processing unit (such as one ECC block, for example), the interpolation flag generating operation is applied to this entire processing unit. Therefore, the problem exists that the interpolation flag generating operation cannot be changed in units smaller than the processing unit, such as one ECC block. The interpolation flag generating operation cannot be changed in units of one sector, for example.

SUMMARY OF THE INVENTION

It is therefore an object of the present invention to reduce the fabrication cost of decoding apparatus and effectively use data in smaller units by changing the interpolation flag generating operation to units of one sector.

Another object of the present invention is to enhance the error correction operation for sector data for which interpolation cannot be performed, and to make available the sector data without any errors.

In carrying out the invention and according to a first aspect thereof, apparatus for decoding encoded data comprises a storage device for storing the encoded data in rows and columns, an error correcting circuit for performing error correction processing on the stored data along the rows and columns; a first flag generating circuit for generating, based on the error correction processing along a data row, a first flag that indicates an error in the data row; and a second flag generating circuit for generating, based on the error correction processing along a data column, a second flag that indicates an error in the data column.

In carrying out the invention and according to a second aspect thereof, a method for decoding encoded data comprises the steps of storing the encoded data in rows and columns; performing error correction processing on the stored data along the rows and columns; generating a first flag, based on the error correction processing along a data row, for indicating an error in a data row; and generating a second flag, based on the error correction processing along a data column, for indicating an error in the data column.

The above and other objects, features and advantages of the present invention will become more apparent from the accompanying drawings, in which like reference numerals are used to identify the same or similar parts in several views.

BRIEF DESCRIPTION OF THE DRAWINGS

FIG. 4 is a diagram illustrating a data sector on the optical disc;

FIGS. 6A–6F show timing charts for writing the output of an EFM+demodulating circuit to the RAM;

FIG. 13 is a diagram of the sector information bits;

FIG. 16 is a flowchart of SALK signal generation processing of the SBCD circuit;

FIG. 21 is a diagram of the bits constituting an error correction result ER;

FIGS. 22A–22G show timing charts of bus arbitration associated with the access to the RAM;

FIG. 23 is a diagram of the number of times the access is made to the RAM during the processing of one data block;

FIGS. 24A–24F show timing charts of the correction result ER being outputted from an OCTL circuit;

FIG. 28 is a diagram illustrating PI flag generation;

FIG. 29 is a diagram illustrating PO flag generation;

FIG. 30 is a diagram illustrating an interpolation flag generating mode;

DETAILED DESCRIPTION OF THE PREFERRED EMBODIMENTS

The invention will now be described in detail by way of an example with reference to the accompanying drawings.

Figure 1:
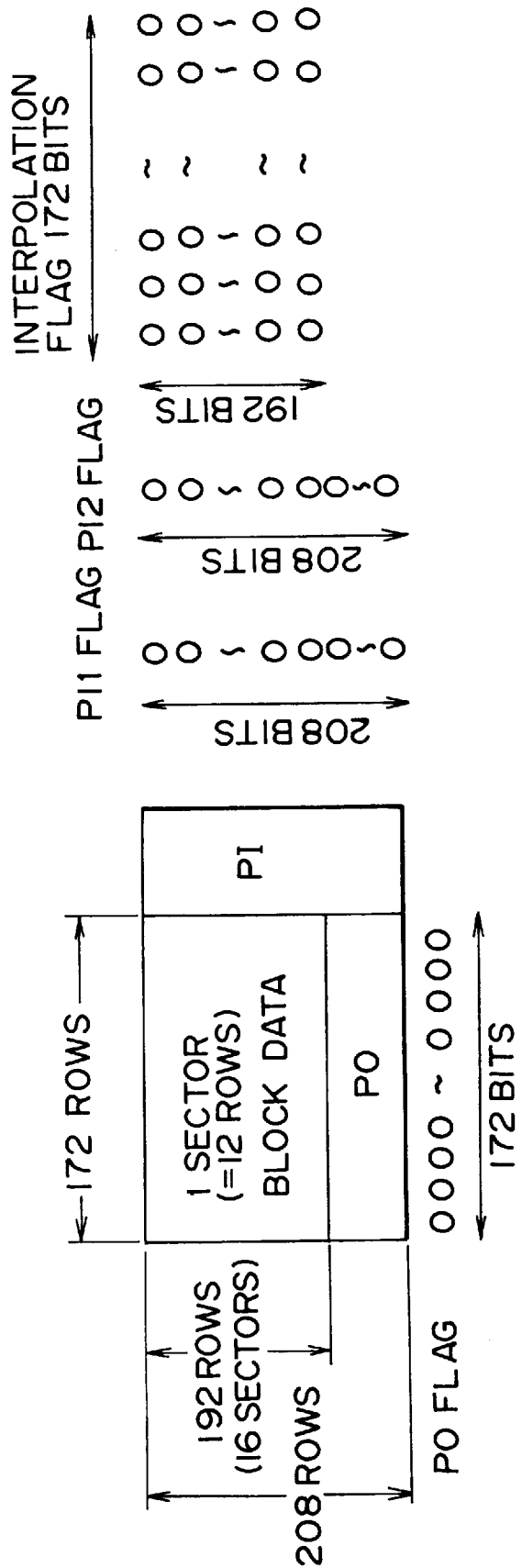
FIG. 1 is a diagram illustrating the relationship between error flags and data in accordance with the present invention.
Figure 33:
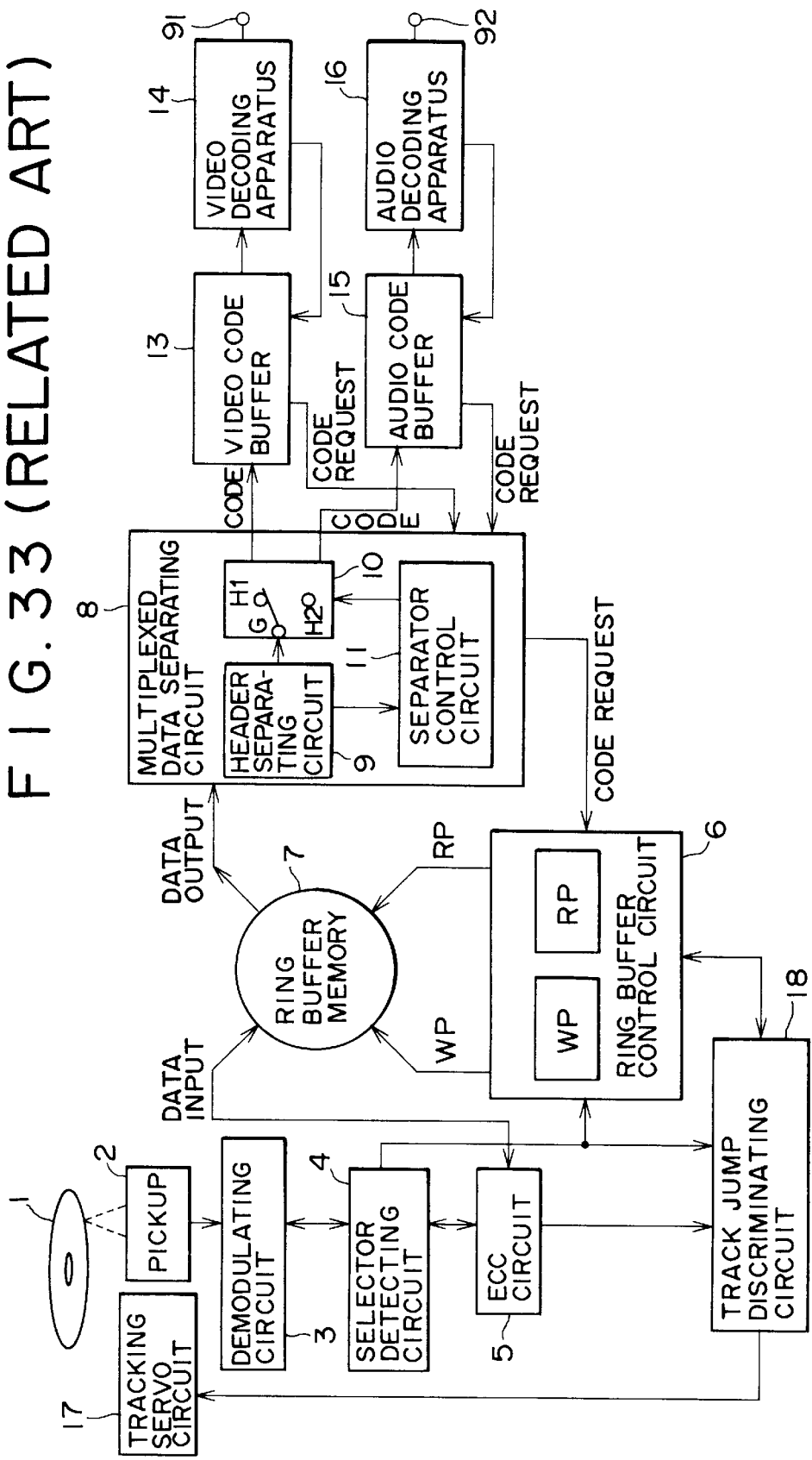
FIG. 33 is a block diagram of representative decoding apparatus.
Figure 34:
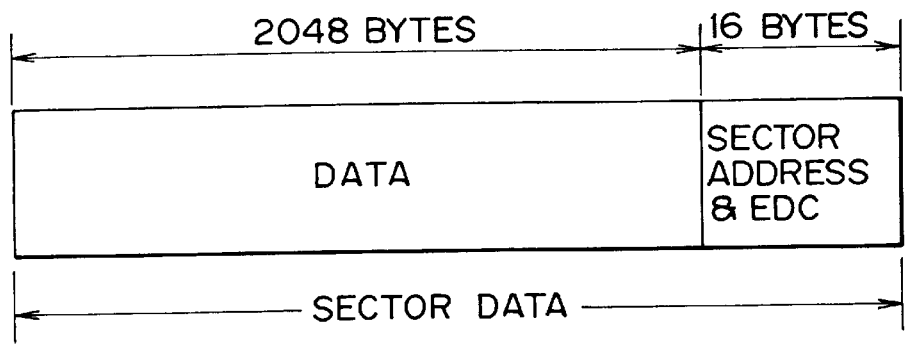
FIG. 34 is a diagram illustrating a data format for one sector.

FIG. 1 illustrates error flags and interpolation flags used in decoding apparatus according to the present invention. In the example of FIG. 33, an interpolation flag obtained by the ECC processing for indicating the necessity for error data interpolation is immediately generated as a result of PI2 correction or sector EDC check. However, in a preferred embodiment of the present invention, a PI1 flag (that is, an error flag consisting of 208 bits) is generated according to the result of the PI1 correction, which is the first error correction processing in the row direction, a PO flag (an error flag consisting of 172 bits) is generated according to the result of the PO correction, which is the error correction processing in the column direction, and a PI2 flag (an error flag consisting of 208 bits) is generated according to the result of the PI2 correction, which is the second error correction processing in the column direction. Then, based on the states of these flags (the PI1 flag, the PI2 flag, and the PO flag), an interpolation flag of 192 by 172 bits corresponding to the main data (that is, the data of 192 by 172 bytes excluding parity) of the ECC block is further generated, as shown in FIG. 1.

Figure 2:
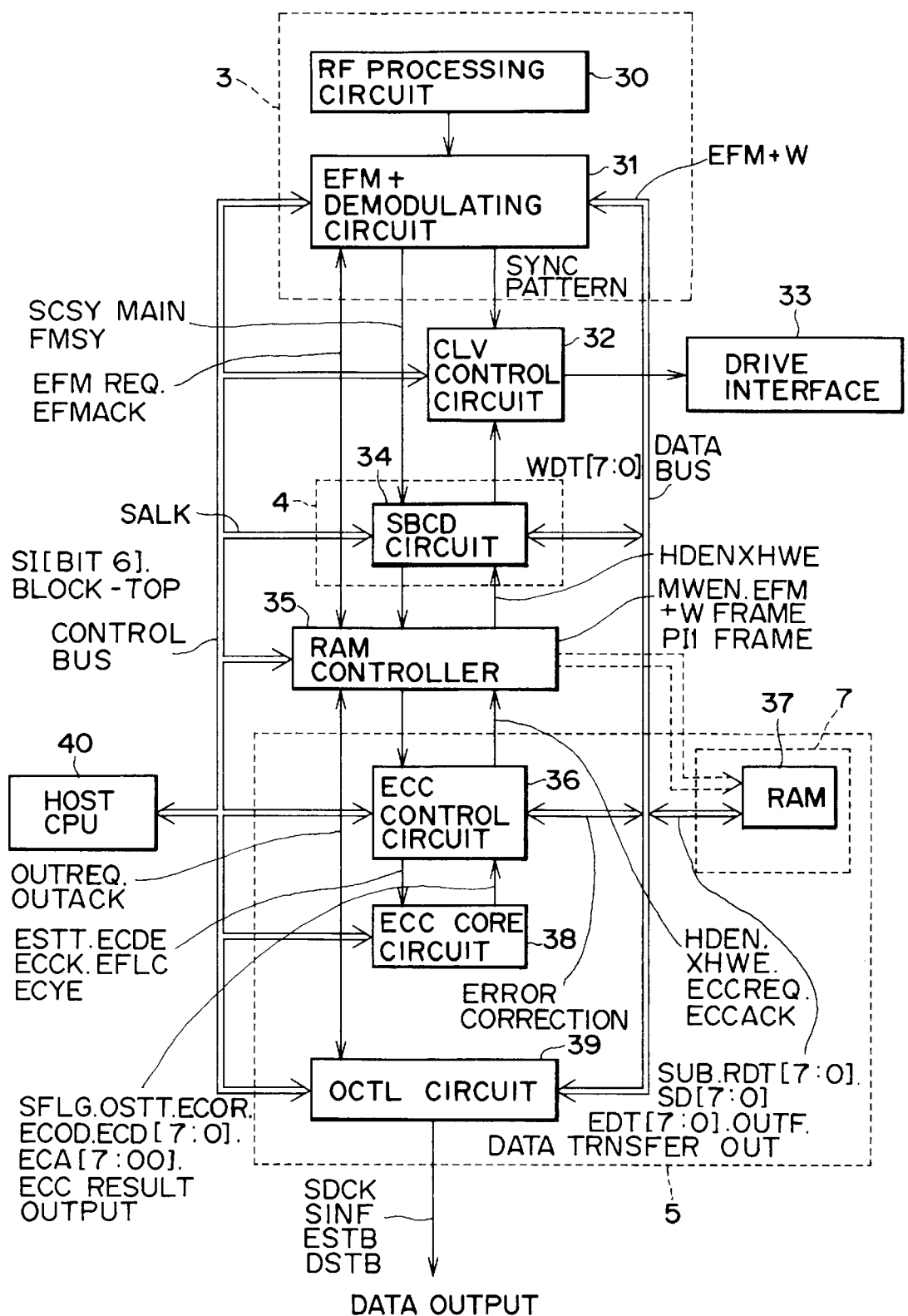
FIG. 2 is a block diagram illustrating the main portion of decoding apparatus according to the present invention.

It will be appreciated that the main portion of the decoding apparatus according to the present invention is substantially the same as the one of FIG. 33. As illustrated in FIG. 2, a demodulating circuit 3 includes an RF processing circuit 30 and an EFM+demodulating circuit 31. A sector detecting circuit 4 comprises an SBCD circuit 34, a RAM control circuit 35, and a RAM 37. An ECC circuit 5 has the RAM control circuit 35, an ECC control circuit 36, the RAM 37, an ECC core circuit 38, and a OCTL circuit 39. For illustrations of additional elements in connection with the above-mentioned circuits of the main portion of the decoder, reference can be made to FIG. 33.

In FIG. 2, the RF processing circuit 30 receives an RF signal from the pickup 2 of FIG. 33. The received RF signal is digitized and then output as a digital signal to the EFM+demodulating circuit 31 for performing EFM+ demodulation and a sync pattern detection. A CLV control circuit 32 controls a drive interface 33 based on a sync pattern received from the EFM+demodulating circuit 31. The SBCD (sub code) circuit 34 detects a sector outputted from the EFM+demodulating circuit 31. The RAM controller 35 controls the read/write operations in the RAM 37.

It should be noted that the RAM 37 is represented differently in FIG. 2 than the ring buffer memory 7 (a storage device) of FIG. 33, and has a different structure. Alternatively, the RAM 37 and the ring buffer memory 7 may have substantially the same structure.

The RAM 37 is configured to store data temporarily when the ECC control circuit 36 performs the error correction processing. The ECC core circuit 38 (that is, the first and second flags generating circuit) generates ECA, ECD, and SFLG data to be described later using Reed-Solomon codes (PI and PO), and outputs the generated codes to the ECC control circuit 36 for performing the error correction, as shown in FIG. 2. The OCTL circuit 39 performs a descramble processing operation, ECD check, and output data control. A host CPU 40 is operative to control each of the components of decoding apparatus.

The operation of the above-mentioned embodiment of the present invention is described next.

An analog signal reproduced from the optical disc 1 is converted by the RF processing circuit 30 to a digital signal. The EFM+demodulating circuit 31 detects a sync pattern from this digital signal. Then, the CLV control circuit 32 applies rough servo control based on the detected sync pattern. Based on the detected sync codes (SY0 to SY7), phase servo control from a PLL (Phase Locked Loop) is applied to the rotational movement of the optical disc 1 via the drive interface 33.

Figure 3:
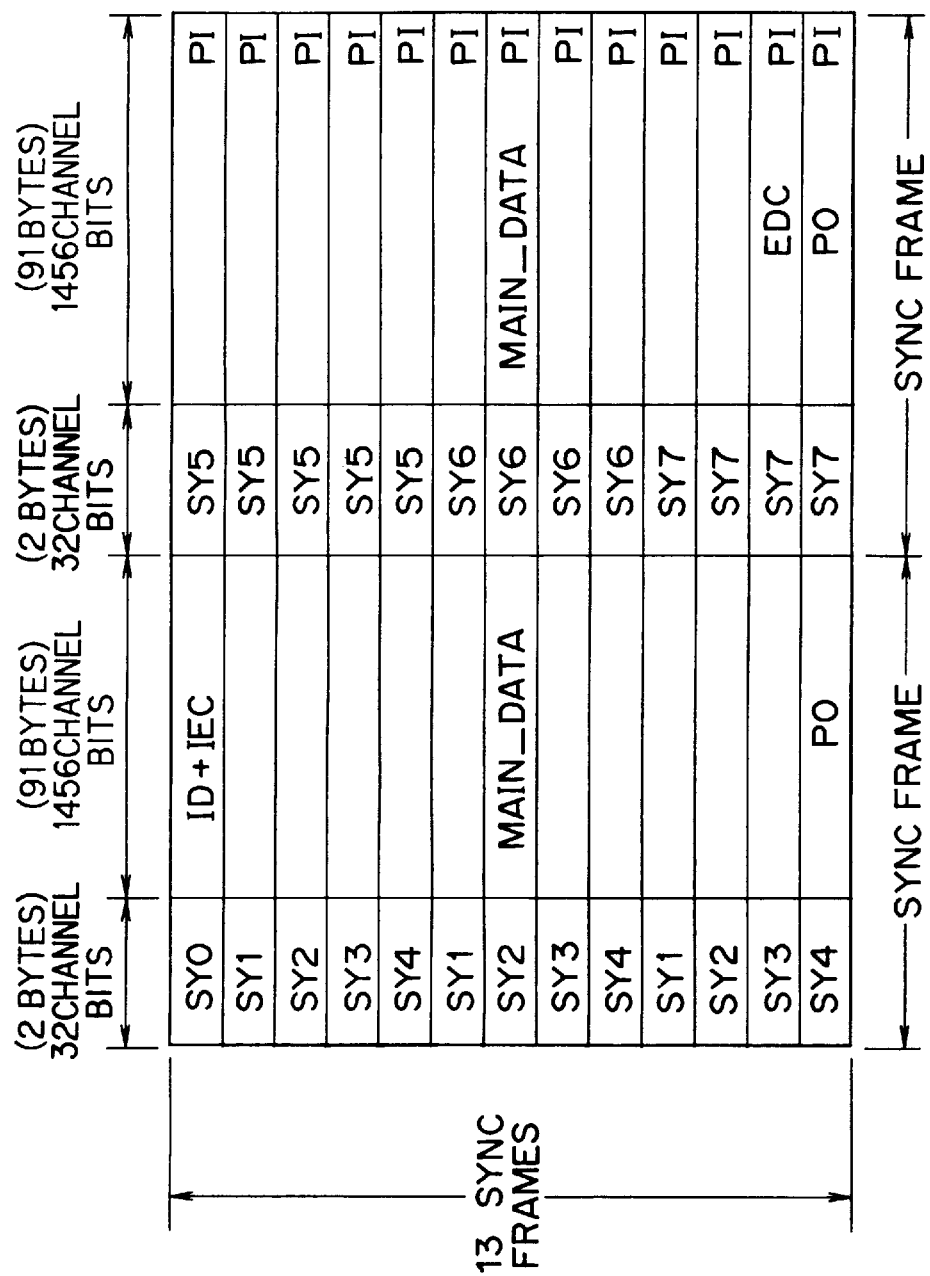
FIG. 3 is a diagram illustrating a configuration of a physical sector on the optical disc.

FIG. 3 illustrates a physical sector configuration on the optical disc 1. The sector is composed of 2 sync frames in the horizontal direction and 13 sync frames in the vertical direction for a total of 26 sync frames. Each sync frame consists of a sync code (SY0 to SY7) of 32 channel bits (16 bits (2 bytes) of data before modulation) and a data part of 1456 channel bits (728 bits (91 bytes) of data before modulation). The data part of the start sync frame contains ID information (a sector number), IEC (ECC of the ID) information, and main data.

In the sync pattern of 32 channel bits, the low-order 22 bits are set to "0001000000000000010001", for example, as a unique pattern that does not appear in the data.

The data part of each sync frame on the left side in FIG. 3 stores main data. The data part of the last sync frame on the left side stores PO information (outside parity). The data part of each sync frame on the right side stores main data and PI information (inside parity). The data part of the sync frame immediately before the last sync frame on the right side stores EDC information and PI information. The data part of the last sync frame on the right side stores PO information and PI information, as shown in FIG. 3.

Figure 37:
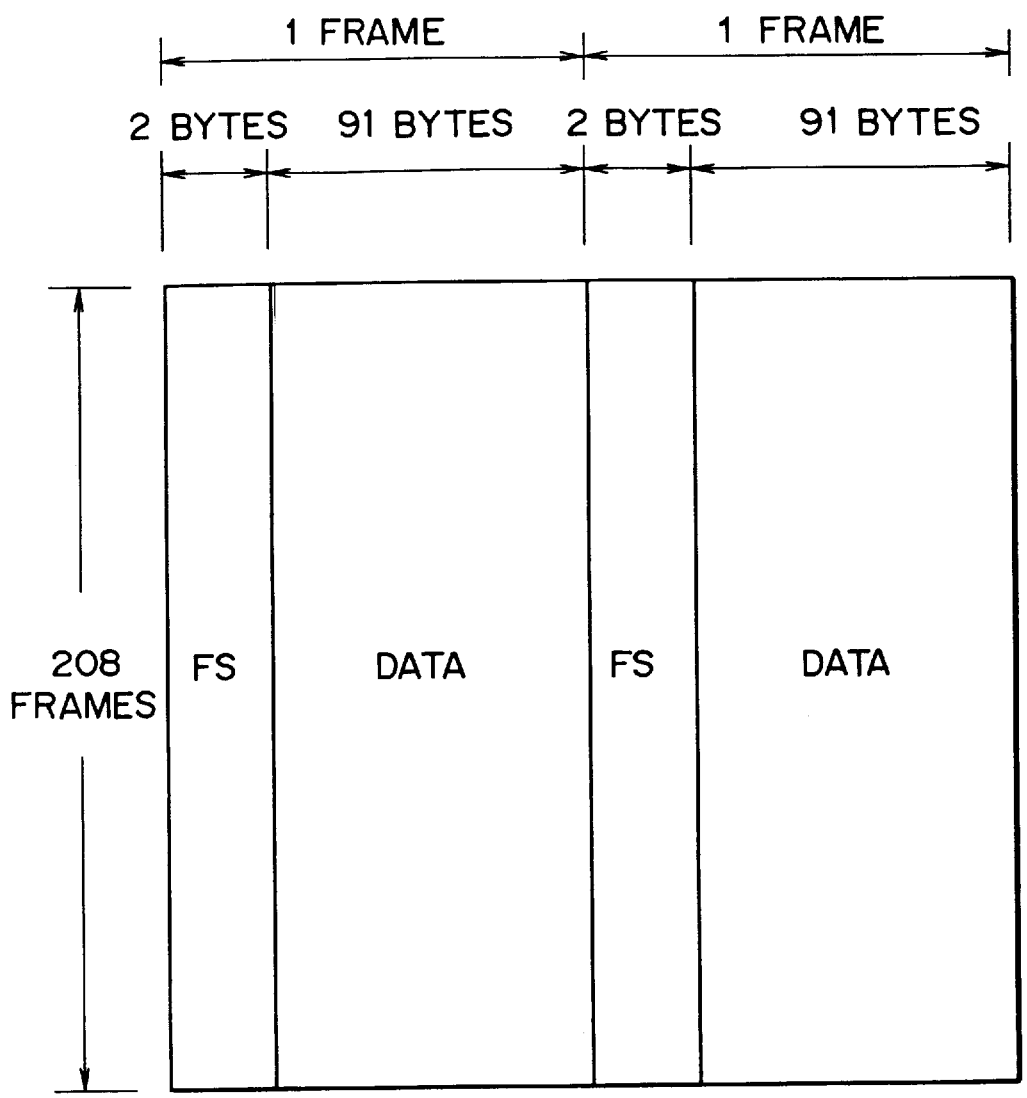
FIG. 37 is a diagram illustrating 32k-byte data block.
Figure 38:
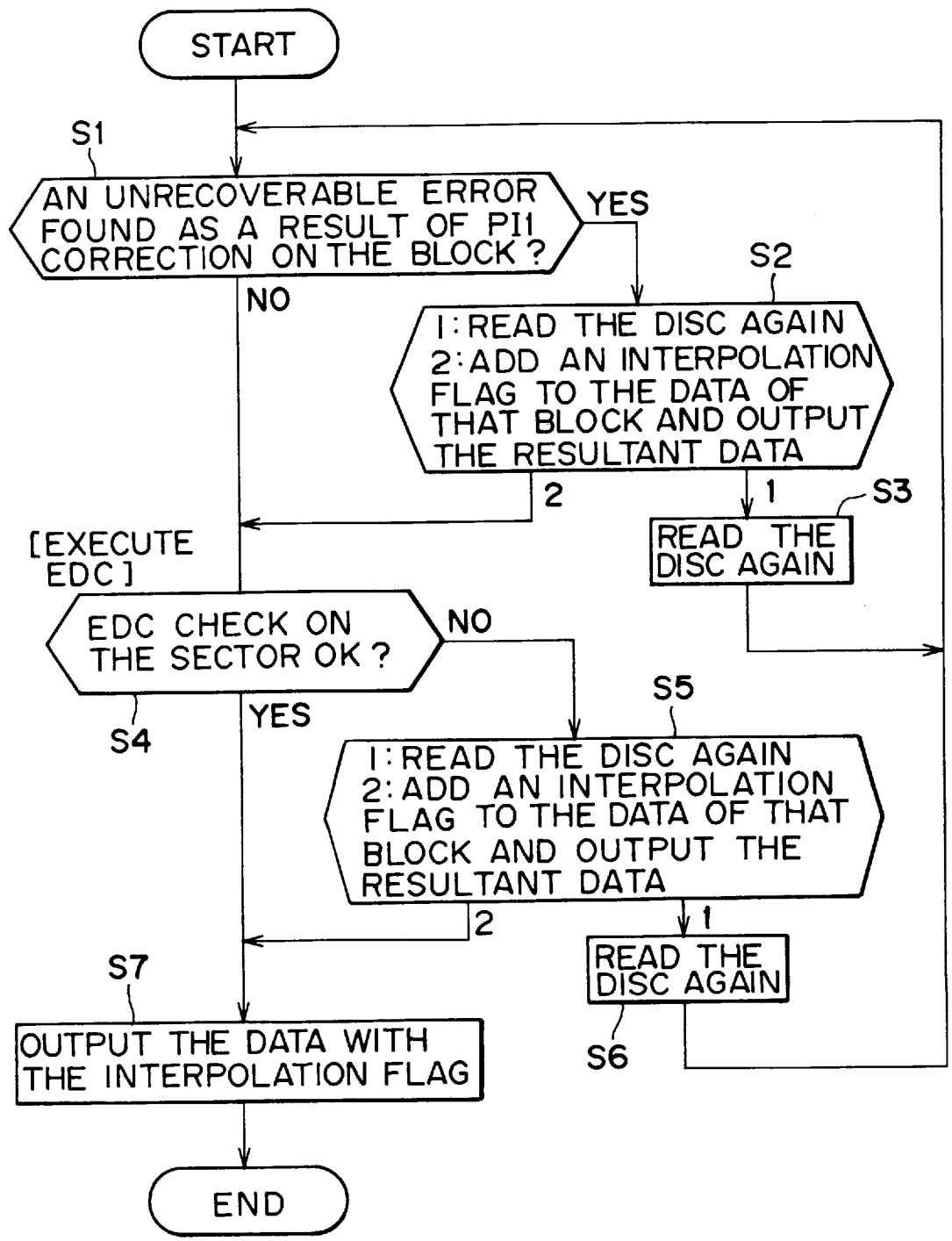
FIG. 38 is a flowchart describing the processing carried out by decoding apparatus of FIG. 33.

Namely, in this embodiment, the ECC block is constituted as shown in FIG. 37, and the PO information is interleaved in each sector.

Data configuration of one sector (except for PI information and PO information) is shown in FIG. 4. The sector data contains an ID (sector number) of 4 bytes, IEC data (ECC for the ID) of 2 bytes, RSV data (reserved area) of 6 bytes, main data, and EDC data of 4 bytes. It is worth noting that the main data is scrambled.

Figure 35:
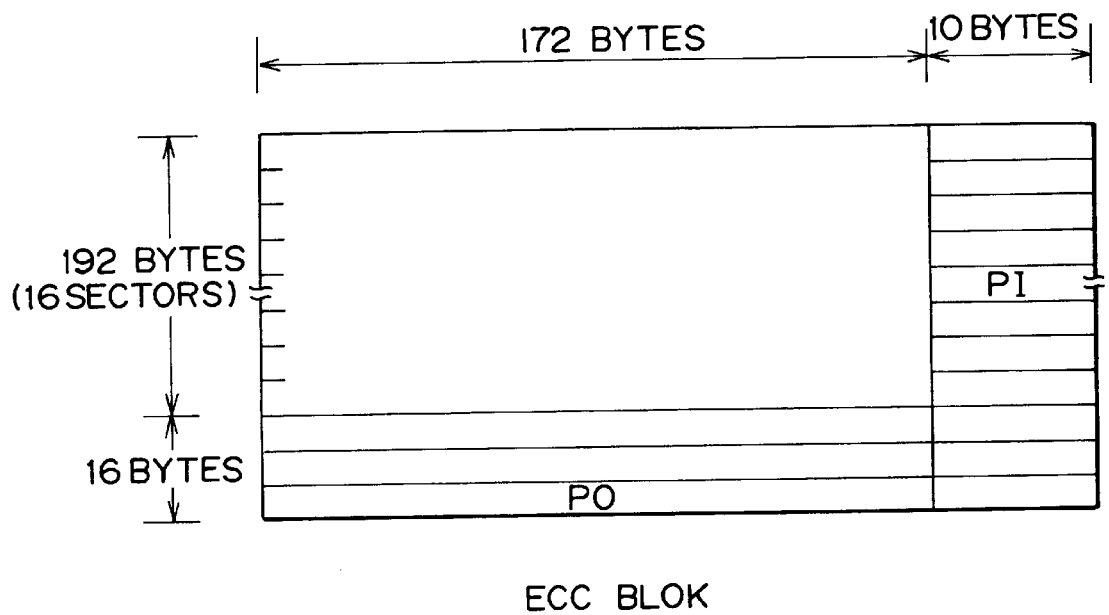
FIG. 35 is a diagram illustrating the configuration of 32k-byte data.

Sixteen sectors are assembled to which a 16-byte PO code and a 10-byte PI code are added, as previously described with reference to FIG. 35. Further, 16 rows including the PO code are interleaved among the 16 data sectors. Sync codes SYx (x=0, 1, 2, . . . , 7) are added to the resultant data, as shown in FIG. 37, and EFM plus modulation is performed thereon. Therefore, the physical sector in the ECC block is composed of 13 by 2 sync frames, as shown in FIG. 3. Since one ECC block includes 16 sectors, the low-order 4 bits of the physical sector address ranges between 0000 and 1111. The physical address of the start sector in the ECC block is 0000.

It will be appreciated that the main data is scrambled by performing an exclusive OR operation between data generated by the low-order 4 bits of the physical sector address and the main data.

The signal symbols used herein are as follows:

block-top (Block Top): A signal that goes HIGH from the beginning of sector with a SYLK signal in HIGH state.

C11M (Clock 11.2896 MHz): A system clock having a frequency of 11.2896 MHz.

DSTB (Data Strobe): A data strobe signal that goes HIGH when the main data is being outputted as stream data SD.

ECA (ERR Correction Address): An error correction address signal that indicates a failing position (address).

ECCK (ECC Clock): An operating clock for the ECC core circuit 38.

ECD (Error Correction Data): Error correction data that provides correct data when an exclusive OR operation is performed between the error data and the error correction data.

ECDE (ECC Code Data End): A control signal that indicates the end of input data.

ECOD (ECC Code ERR): A signal that goes HIGH when the error correction cannot be performed.

ECOR (ECC Correction): A strobe signal that indicates output of error-recoverable data.

ECYE (ECC Cycle End): A control signal that indicates the end of a cycle of input code data.

EDT (ECC Data): Data read from the RAM 37 for the error correction and transferred to the ECC control circuit 36.

ESTB (Error Strobe): An error correction result strobe signal that goes HIGH when an error correction result ER is transferred.

ESTT (ECC Start): A control signal that indicates the start of input data.

EFM+W Frame (EFM+Write Frame Counter): A signal that indicates a main frame is to be written to the RAM 37.

HDEN (Header Data Enable): A strobe signal for sector header data.

main-FMSY (main Frame Sync): A signal that goes HIGH at the main sync (the start sync) of each PI row.

MWEN (Memory Write Enable): A write enable signal for writing EFM+demodulated data to the RAM 37.

MWRQ (EFM Write Request): A write request signal for writing EFM+demodulated data to the RAM 37.

OUTF (Output Flag): An interpolation flag (an output flag).

OSTT (ECC Output Start): A signal that is outputted with a delay after ESTT of 477 clock cycles (ECCK) in a predetermined code series.

RDT (Read Data): Data on the data bus of the RAM 37.

SALK (Sector Address Lock): A signal for indicating that a sector address (ID) has been detected normally.

SAUL (Sector Address Unlock): A signal having a polarity reverse to that of the SALK signal.

SCSY (Sector Sync): A signal that goes HIGH at the SYO frame for determining the start of a sector.

SD (Stream Data): Stream data (decoded output data).

SDCK (Stream Data Clock): The clock of the stream data.

SFLG (Sector Flag): An ECC uncorrectable flag for the PI1 correction.

SINF (Sector Information): A sector information strobe signal that goes HIGH at the start of the sector.

SUB (SUB Data): Data including ID data and IEC data to be transferred to the SBCD circuit 34.

SYLK (Sync Lock): A signal that goes HIGH when a sync code has been sequentially detected three times.

SYUL (Sync Unlock): A signal having a polarity reverse to that of the SYLK signal.

WDT (Write Data): Data on the data bus of the RAM 37.

XHWE (Sector Header Write Enable): An output enable signal for writing sector information from the SBCD circuit 34 to the RAM 37.

Figure 5:
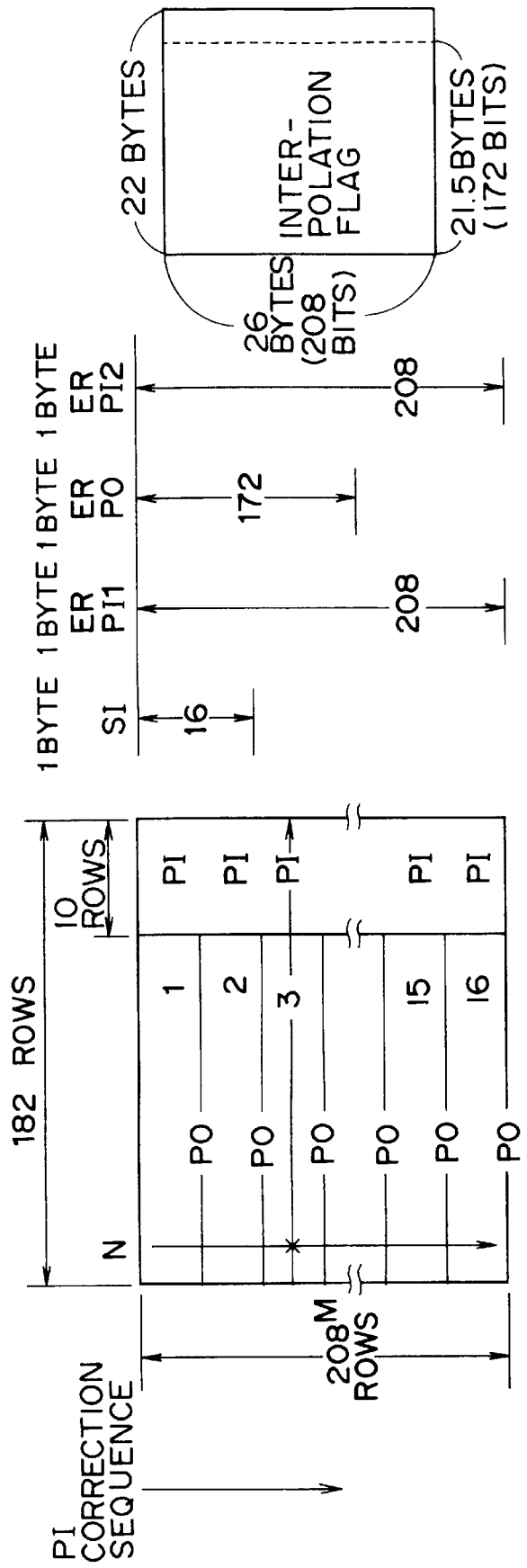
FIG. 5 is a diagram illustrating a representative operation of storing data, error flags, and interpolation flags in a RAM.

The data demodulated by the EFM+demodulating circuit 31 of FIG. 2 is stored in the RAM 37 under the control of the RAM controller 35, as shown in FIG. 5. One ECC block is shown in FIG. 5. In reading data from the RAM 37, the RAM controller 35 designates the row and column values (as shown in FIG. 5) to retrieve the desired data. Namely, in FIG. 5, data x located at the Nth byte of the Mth row can be obtained from the RAM 37 by designating two values (M and N).

Further shown in FIG. 5 is sector information SI (to be described later in detail) corresponding to each PI row on a byte-by-byte basis, and is stored in correspondence with 16 PI rows starting from the top row. The PI1 and PI2 flags are stored in correspondence with each of 208 PI rows. The PO flags are stored such that they correspond to 172 PI rows from the top sequentially.

FIG. 5 also shows the interpolation flags of 208 by 172 bits arranged as bytes. The interpolation flags of 26 by 22 bytes (actually 21.5 bytes) are stored on a byte-by-byte basis in an area different from the main data area in the ECC block. Namely, a 1-bit interpolation flag corresponds to the main data of 1 byte.

The above-mentioned configuration prevents the memory capacity required for storing the interpolation flags from being expanded unnecessarily.

When the start of a data sector recorded on the optical disc 1 is recognized based on the type and continuity of the sync code, the data demodulated by the EFM+demodulating circuit 31 is stored in the RAM 37 beginning with the start data sequentially. FIGS. 6A–6F illustrate the timing charts of the signals associated with this operation.

Figure 7:
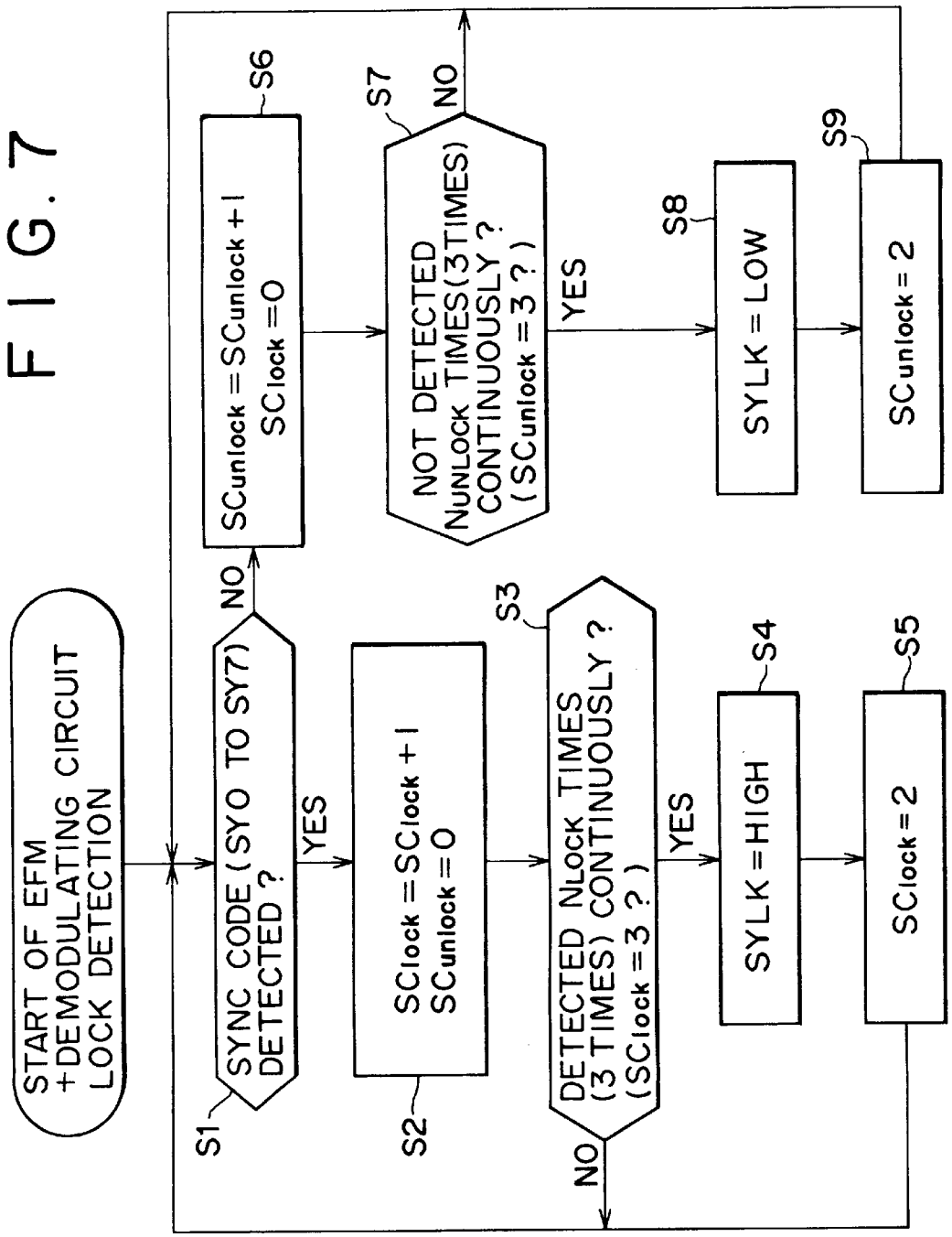
FIG. 7 is a flowchart for the lock detection processing of the EFM+demodulating circuit.

Namely, the EFM+demodulating circuit 31 detects a sync locked state, as shown in FIG. 7. First, in step S1, it is determined whether the sync codes (SY0–SY7) have been detected in each sync frame. If the sync code has been detected, the process goes to step S2, where a variable SClock is incremented by one, and a variable SCunlock is set to 0. The variable SClock indicates the number of times the sync code has been detected continuously, and the variable SCunlock indicates the number of times the sync code has not been detected continuously.

Next, in step S3, it is determined whether the variable SClock is equal to 3. Namely, it is determined whether the sync code has been detected three times continuously. If the variable SClock is smaller than 3, the process goes back to step S1 to repeat the processing therefrom. If the variable SClock is found to be equal to 3 in step S3, it is determined that a locked state has been set and, in step S4, the SYLK signal is set to HIGH level. Then, in step S5, the variable SClock is set to 2 to determine whether the sync code has been detected three times continuously. Then, the process goes back to step S1 to repeat the processing operations therefrom.

If the sync code has not been detected in step S1, the next operation is carried out in step S6, in which the variable SCunlock is incremented by one, and the variable SClock is set to 0. In step S7, it is determined whether the variable SCunlock is equal to 3. Namely, it is determined whether the sync code has not been detected three times continuously. If the number of times the sync code has not been detected is 2 or less, the process returns to step S1. If the sync code has not been detected three times continuously, the process goes to step S8, in which the SYLK signal is set to LOW level. Then, in step S9, the variable SCunlock is set to 2 in order to keep the SYLK signal at LOW level if no sync code is detected during the next sync code generation timing. The process then returns to step S1.

Thus, the EFM+demodulating circuit 31 detects the sync code to monitor continuously whether the locked state is set.

In the above-mentioned preferred embodiment, the number of times the sync code is detected has been arbitrarily set to 3. It will be appreciated that the reference number of times the sync code is detected continuously (Nlock) and the reference number of times the sync code is not detected continuously (Nunlock) may be set to any preselected values.

Figure 8:
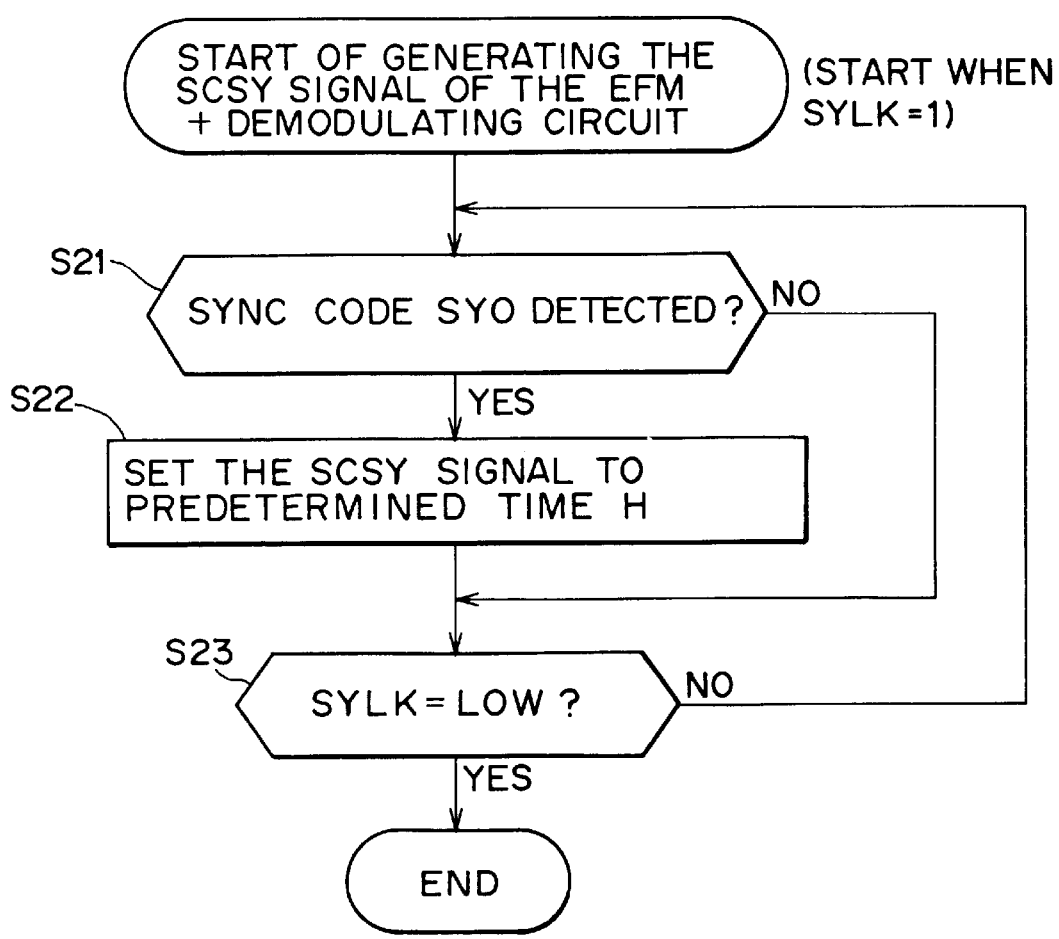
FIG. 8 is a flowchart for the SCSY signal generation processing of the EFM+demodulating circuit.

The EFM+demodulating circuit 31 executes the processing as shown in the flowchart of FIG. 8, when the SYLK signal is HIGH (that is, in the locked state as described above). In particular, in step S21, it is determined whether the sync code SY0 arranged at the beginning of each sector has been detected. If the sync code SYO has been detected, the process continues with step S22, in which the SCSY signal indicating the beginning of the sector is set to a predetermined time H. Next, in step S23, it is determined whether the SYLK signal has changed to LOW. If not (that is, the SYLK signal remains HIGH), the process goes back to step S21 to repeat the processing therefrom. If, in step S21, it is determined that the sync code SYO has not been detected, the processing of step S22 is skipped.

Thus, the EFM+demodulating circuit 31 generates the SCSY signal (shown in FIG. 6A) at the beginning of each sector.

Figure 9:
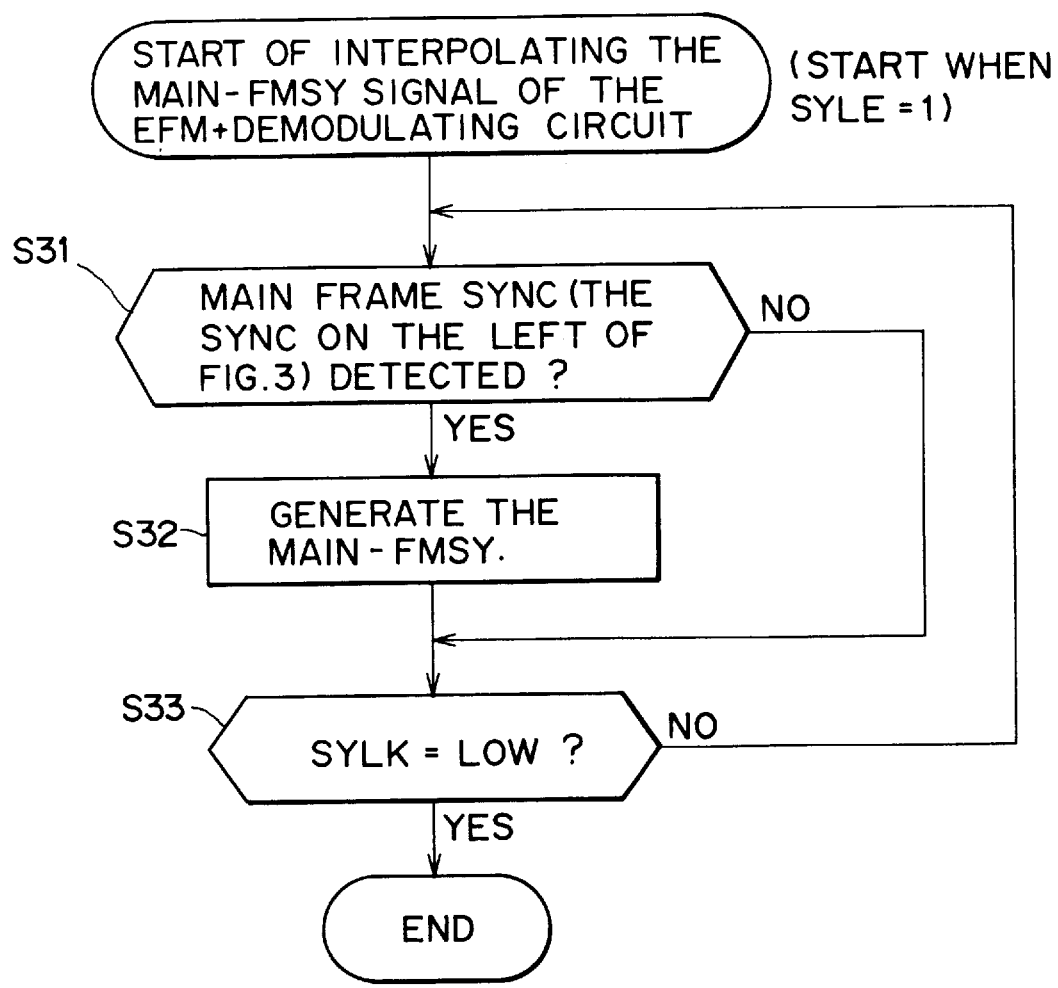
FIG. 9 is a flowchart for the main-FMSY signal interpolation processing of the EFM+demodulating circuit.

Further, the EFM+demodulating circuit 31 executes the processing shown in the flowchart of FIG. 9 when the SYLK signal goes HIGH. First, in step S31, it is determined whether the sync code (the sync codes on the left side of FIG. 3 are referred to as main frame syncs) of a main frame (2 sync frames in the horizontal direction of FIG. 3 are collectively referred to as one main frame) has been detected. If a main frame sync has been detected, the process goes to step S32, in which the EFM+demodulating circuit 31 generates the main-FMSY signal, as shown in FIG. 6B. In step S31, if no main frame sync has been detected, the processing of step S32 is skipped.

Then, the process goes to step S33, where it is determined whether the SYLK signal has changed to LOW. If no change is detected (that is, the SYLK signal remains HIGH), the operations go back to step S31 to repeat the processing therefrom. If the SYLK signal has changed to LOW, generation of the main-FMSY signal is stopped.

Thus, the EFM+demodulating circuit 31 generates the main-FMSY signal in every cycle (the cycle of 2 sync frames in the horizontal direction in FIG. 3) of the main frame sync.

When the SCSY signal is received from the EFM+demodulating circuit 31, the RAM controller 35 sets the MWEN signal to HIGH as shown in FIG. 6D. The write processing operation for writing data of the detected sector to the RAM 37 is thereby started. Namely, at this moment, as shown in FIG. 6E, the RAM controller 35 counts the main frames (shown in FIG. 3) using EFM+W Frame counter (not shown). The resultant count value indicates the number of main frames from the top, as shown in FIG. 3.

In addition, the RAM controller 35 controls the number of the main frames to be transferred to the RAM 37 using a PI1 frame counter (not shown), as illustrated in FIG. 6F.

In particular, when the first main frame of FIG. 3 is written to the RAM 37, the ECC control circuit 36 receives the main frame data under the control of the RAM controller 35. Then, the ECC control circuit 36 transfers this data to the ECC core circuit 38 for carrying out the error correction processing (the PI1 processing). The PI1-processed data is then stored in the RAM 37.

After the PI1 correction, the RAM controller 35 reads ID and IEC data from the main frame data stored in the RAM 37, and transfers the ID and IEC data of the main frame to the SBCD circuit 34 via the data bus, as indicated by number 0 in FIG. 6C. As shown in FIG. 3, since the ID and the IEC data are arranged at the beginning of each sector, this transfer processing is performed only in the main frame having number 0. In the SBCD circuit 34, the address (ID) of each physical sector is detected as described above.

Then, based on the low-order 4 bits of the address of the detected physical sector, the start sector of the ECC block is detected.

FIGS. 10A–10H are timing charts for detecting a signal block-top following the above-mentioned transfer of the ID data. FIGS. 11A–11H are timing charts illustrating the processing to be performed after the detection of the signal block-top. The operations shown in these figures will be described later.

FIGS. 12A–12F show timing charts illustrating, in more detail, the above-mentioned ID transfer. In accordance with FIG. 12A, the RAM controller 35 outputs the HDEN signal to the SBCD circuit 34 for indicating the timing at which the ID and the IEC data are read from the RAM 37. At this moment, the ID data (4 bytes) and the IEC data (2 bytes) are transferred in synchronization with a clock C11M (FIG. 12F) having a frequency of 11.2896 MHz as read data RDT (FIG. 12C) consisting of 8 bits (bits 7 through 0). That the ID data and the IEC data are not in the error unrecoverable state as a result of the PI1 correction is indicated by the SFLG signal (in this case, the SFLG signal is HIGH) supplied from the ECC core circuit 38 to the ECC control circuit 36. After receiving the ID (the sector address), the SBCD circuit 34 generates sector information SI for that ID (the sector address) in response to a command (such as interpolation generating mode, start sector, or end sector) issued by the host CPU 40. For example, in the sector having the ID designated by the host CPU 40, 1 is set in bit 5 of the sector information, and 0 is set in bit 4.

FIG. 13 illustrates the structure of the sector information (SI). As shown, the bits constituting the sector information have the following meanings.

Bit 7: the interpolation flag (OUTF) generating mode (1=the interpolation flag generating mode).

Bit 6: the start sector of ECC block (1 when the low-order 4 bits of the physical sector address are 0s; 1=the start sector).

Bit 5: detect the start sector (1 when the physical sector address matches the start sector address designated by the host CPU 40; 1=the start sector).

Bit 4: detect the end sector (1 when the physical sector address matches the end sector address designated by the CPU 40; 1=the end sector).

Bit 3: bit 3 of a descramble initialization address (bit 7 of the physical sector address).

Bit 2: bit 2 of the descramble initialization address (bit 6 of the physical sector address).

Bit 1: bit 1 of the descramble initialization address (bit 5 of the physical sector address).

Bit 0: bit 0 of the descramble initialization address (bit 4 of the physical sector address).

Figure 12:
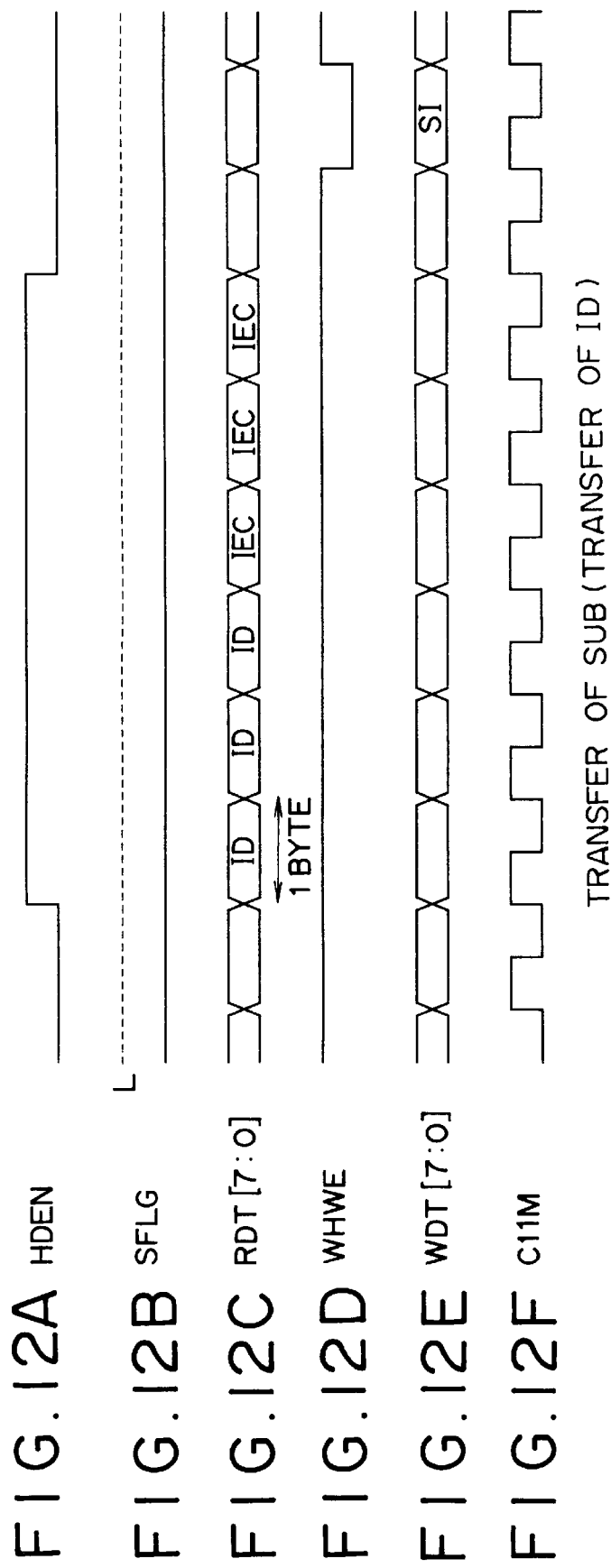
FIGS. 12A to 12F show timing charts of signals of the main portion associated with SUB transfer.

After the check processing is performed using the 4-byte ID and the 2-byte IEC, which will be described later with reference to FIGS. 14 through 16, the XHWE signal shown in FIG. 12D is set to LOW by the ECC control circuit 36. At this moment, the sector information SI is transferred from the SBCD circuit 34 to the RAM 37 as the 8-bit write data WDT. The sector information for 16 sectors is stored in correspondence with the upper 16 PI rows, as shown in FIG. 5. Therefore, by designating the desired number of PI rows, the corresponding sector information can be obtained.

Next, the ID and IEC check processing by the SBCD circuit 34 is described with reference to the flowcharts of FIGS. 14 through 16.

Figure 14:
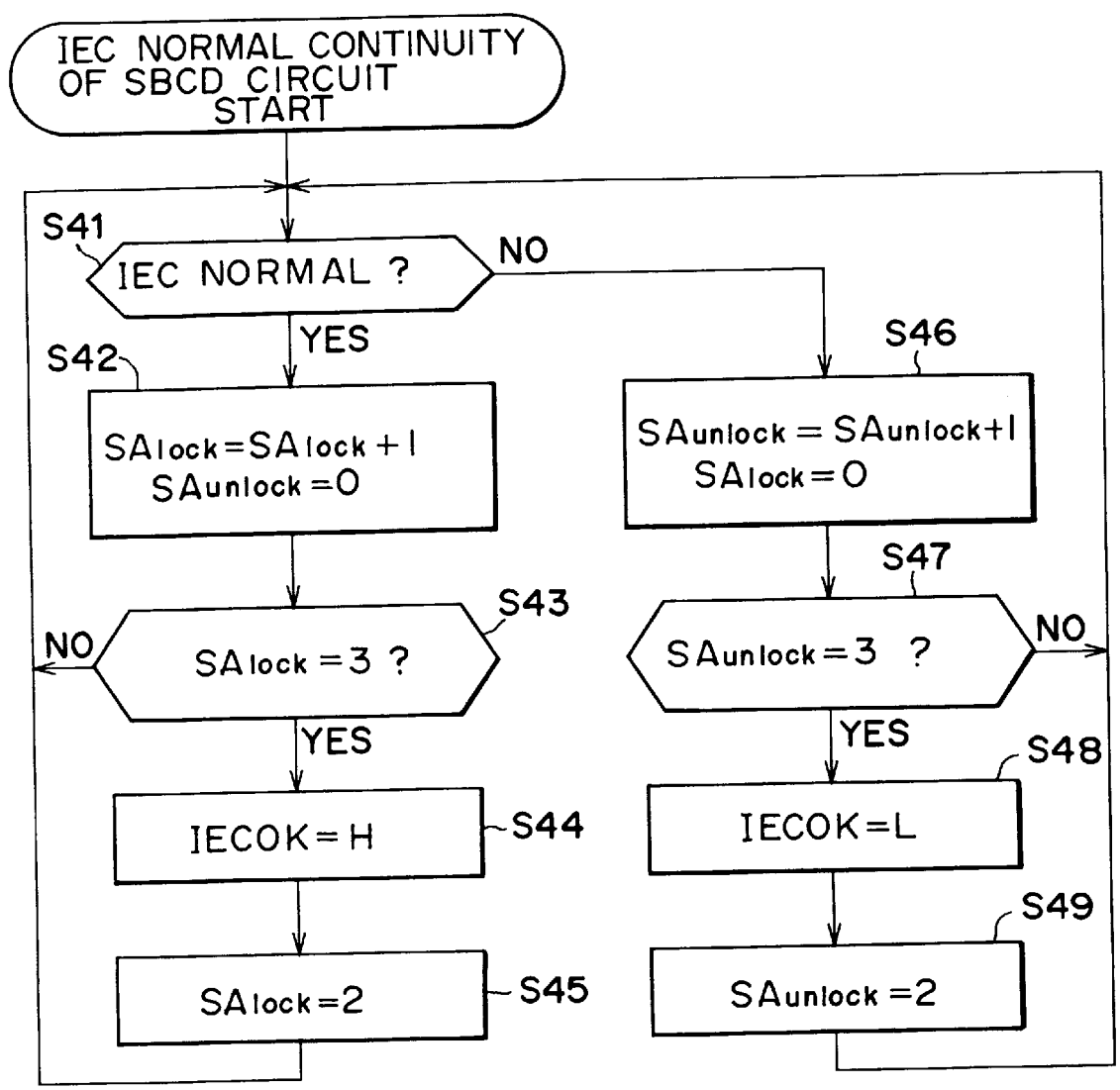
FIG. 14 is a flowchart of IEC normal continuity processing of an SBCD circuit.

In FIG. 14, the SBCD circuit 34 determines whether the number of sectors for which IEC is normal (that is, an ID has no error) is N (3 in the present embodiment) or higher continuously. Therefore, in the first step S41, it is determined whether the IEC captured data is normal. If the IEC is found normal, the process goes to step S42, in which the variable SAlock indicating the number of sectors having the normal IEC is incremented by one. Then, the variable SAunlock indicating the number of times the sector having the erroneous IEC (that is, the ID having an error) has been continuously detected is set to 0.

Then, in step S43, it is determined whether the variable SAlock is equal to 3. If the variable SAlock incremented in step S42 is not equal to 3, the process returns to step S41 to repeat the processing therefrom. If the variable SAlock is found to be equal to 3 in step S43 (namely, if the sectors having a normal IEC have been reproduced three times continuously), the processing of step S44 is carried out, in which the flag IECOK is set to HIGH. In step S45, the variable SAlock is reset to 2, and the process returns to step S41 to repeat the processing therefrom.

If, in step S41, the IEC is found abnormal, then the process goes to step S46, in which the variable SAunlock is incremented by one and, at the same time, the variable SAlock is set to 0. Then, in step S47, it is determined whether the variable SAunlock is equal to 3: if this variable is not equal to 3, the process returns to step S41 to repeat the processing therefrom.

If, in step S47, the variable SAunlock is found to be equal to 3 (namely, if the sectors whose IEC is not normal have been detected three times continuously), the process goes to step S48, in which the flag IECOK is set to LOW. Next, in step S49, the variable SAunlock is set to 2 in order to detect that the continuous number of times the IEC is not normal is three. Then, the process goes back to step S41 to repeat the processing therefrom.

Thus, the SBCD circuit 34 sets the flag IECOK to HIGH, if the IECs are normal three times continuously or sets the flag to LOW if the IECs are not normal three times continuously.

Figure 15:
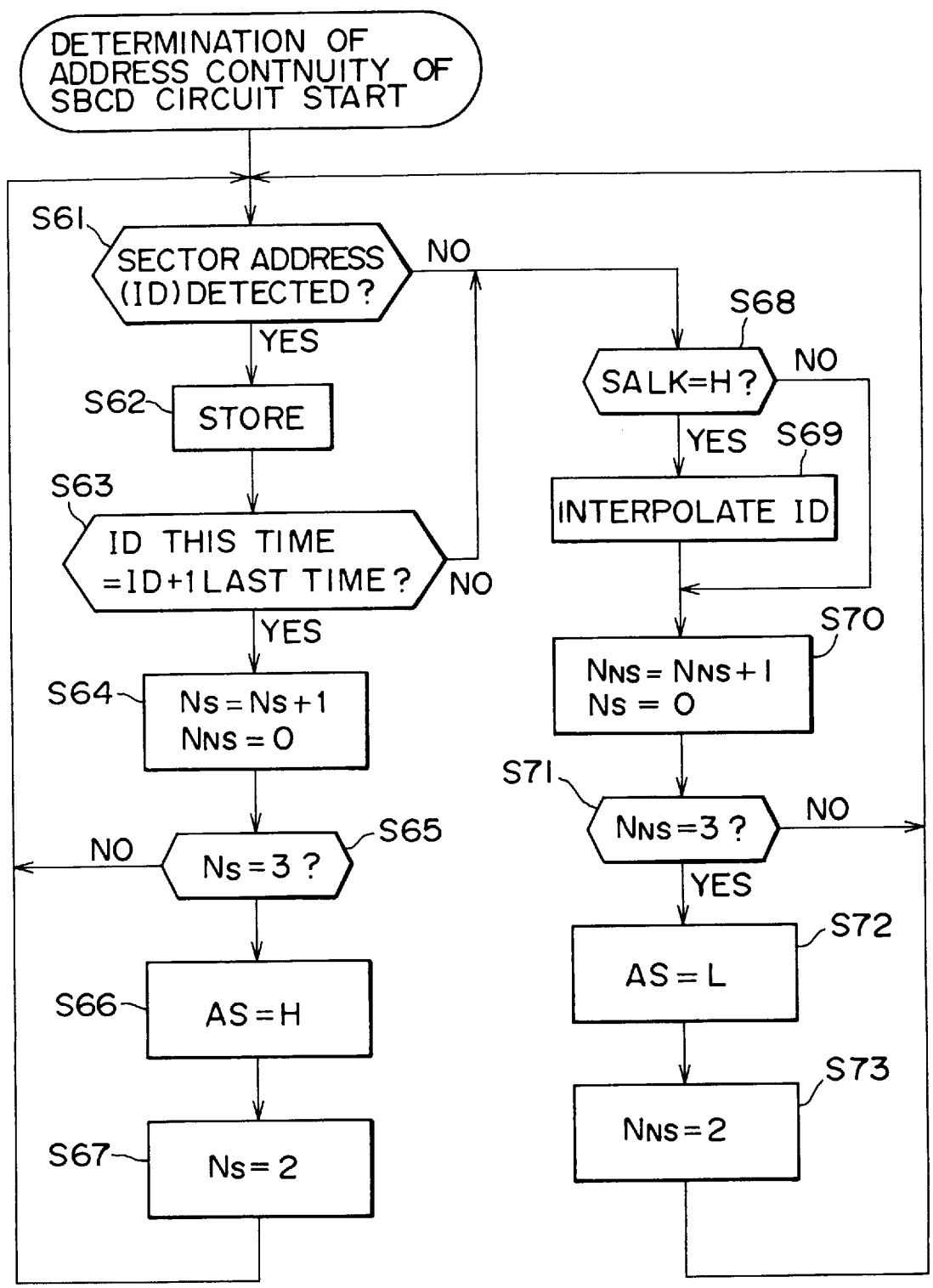
FIG. 15 is a flowchart of address continuity determination processing of the SBCD circuit.

Further, the SBCD circuit 34 determines the continuity of the IDs (addresses) by the processing shown in FIG. 15. Namely, the ID of each sector in one ECC block is sequentially incremented by one. Therefore, the continuity is determined as follows.

First, in step S61, it is determined whether an ID has been detected. If the ID has been detected, the process goes to step S62, in which the detected ID is stored for comparing with the next ID. Then, in step S63, it is determined whether the ID detected this time is greater by one than the ID stored in the previous step. If the ID detected this time is greater than the stored ID by one, the process in step S64 is carried out, where the variable for indicating that the correct IDs have been detected continuously is incremented by one. If no ID has been detected or the IDs have been detected not continuously, the variable Nns for indicating the number of times the IDs are not continuous is set to 0.

Then, in step S65, it is determined whether the variable Ns is equal to 3. If so (if IDs incremented by one have not been detected three times continuously), the process goes back to step S61 to repeat the processing therefrom. If the variable Ns is found to be equal to 3, the process goes to step S66, in which the flag AS for indicating that the IDs are continuously in the normal state is set to HIGH. Next, in step S67, the variable Ns is set to 2 so that, if the next ID has been detected, it can be determined that the correct IDs have been detected three times continuously. Then, the process goes back to step S61 to repeat the processing therefrom.

If, in step S61, no ID has been detected or the ID detected this time is found to be not greater than the ID detected last time by one (namely, if the IDs are not consecutive), the process goes to step S68, in which it is determined whether the flag SALK is HIGH. This flag SALK, which will be described with reference to FIG. 16, is set to HIGH if the IECs are normal three or more times continuously, and the continuity of the IDs is maintained three or more times.

If, in step S68, the flag SALK is found HIGH, the process goes to step S69, where the processing for interpolating the IDs is performed. Namely, since no ID has been detected or the IDs are not continuous, an ID obtained by adding 1 to the last ID is generated, and the resultant ID is used for the detected ID. If the flag SALK is set to LOW, such interpolation processing is not performed, and therefore the processing of step S69 is skipped.

Then, in step S70, the variable Nns is incremented by one, and the variable Ns is set to 0. Then, in step S71, it is determined whether the variable Nns is equal to 3. If this is not the case, the process returns to step S61 to repeat the processing therefrom. If the variable Nns is 3, the process goes to step S72, in which the flag AS is set to LOW. Next, in step S73, the variable Nns is set to 2 so that, if the next ID has not been detected, it can be determined that the IDs have not been detected three times continuously. Then, the process goes back to step S61 to repeat the processing therefrom.

Thus, the SBCD circuit 34 sets the flag AS to HIGH when the continuity of the IDs is maintained, and sets the flag AS to LOW otherwise.

The SBCD circuit 34 uses the two flags IECOK and AS as described above to generate the flag SALK.

In particular, in step S81 of FIG. 16, it is determined whether the flag IECOK is HIGH. If the flag IECOK is found HIGH, the process goes to step S82, in which it is determined whether the flag AS is HIGH. If, in step S82, the flag AS is HIGH, the process in step S83 is performed, where the flag SALK is set to HIGH.

If, in step S81, the flag IECOK is found LOW or if, in step S82, the flag AS is found LOW, then the process goes to step S84, in which the flag SALK is set to LOW.

Thus, in the SBCD circuit 34, if the IECs continue to be normal three times or more, and the IDs are incremented by one three times or more continuously, the flag SALK is set to HIGH; if the IECs continue to be not normal three times or more, or if the IDs are not continuous three times or more, the flag SALK is set to LOW.

The host CPU 40 detects the position (the access position on the optical disc 1) to which the laser beam is currently projected by referring to the state of the flag SALK and the ID data, as described above.

It will be appreciated that the result of the PI1 correction may be added to the conditions of the variable SAlock or variable SAunlock of FIG. 14. Further, the number of times specified by these variables is 3. It is apparent that the number of times may be set to another value by the host CPU 40.

When the flag SYLK is set to LOW (when the flag SYUL goes HIGH) with the flag SALK also being LOW (when the flag SAUL is HIGH), writing of the EFM+demodulated data from the EFM+demodulating circuit 31 to the RAM 37 is reset. Then, when the unlock state is cleared (SAUL=LOW), by setting the flag SYLK to HIGH, the writing of the EFM+demodulated data to the RAM 37 restarts.

It will be appreciated that the unlock operation can also be forcibly executed by the host CPU 40. For example, setting the unlock state by the host CPU 40 after executing a jump operation between tracks can reset the ECC control.

It will also be appreciated that the unlock state may be cleared selectively by either executing the clearing operation by the host CPU 40 or automatically executing the clearing operation.

Figure 10:
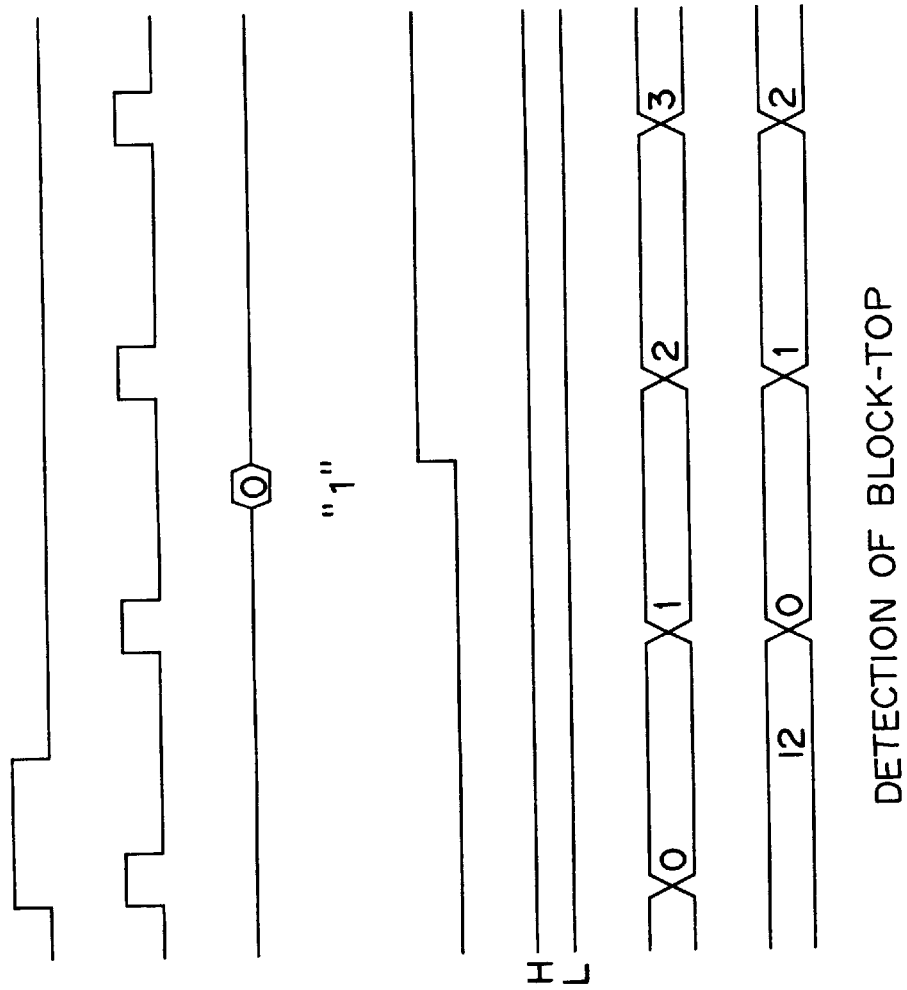
FIGS. 10A–10H show timing charts for block-top detection.

When the flag SYLK is HIGH (the locked state) and the bit 6 of the sector information is 1 (the beginning of the sector), the SBCD circuit 34 keeps the signal block-top at HIGH level (as shown in FIG. 10) until the flag SYLK becomes LOW (that is, the locked state is cleared). If the signal block-top is LOW, when the SCSY and the main-FMSY both become HIGH (the beginning of the sector), the value of the EFM+W Frame is set to 0 after 12. Namely, in this case, the value of the EFM+W Frame repeats 0 through 12 for each main frame.

Figure 11:
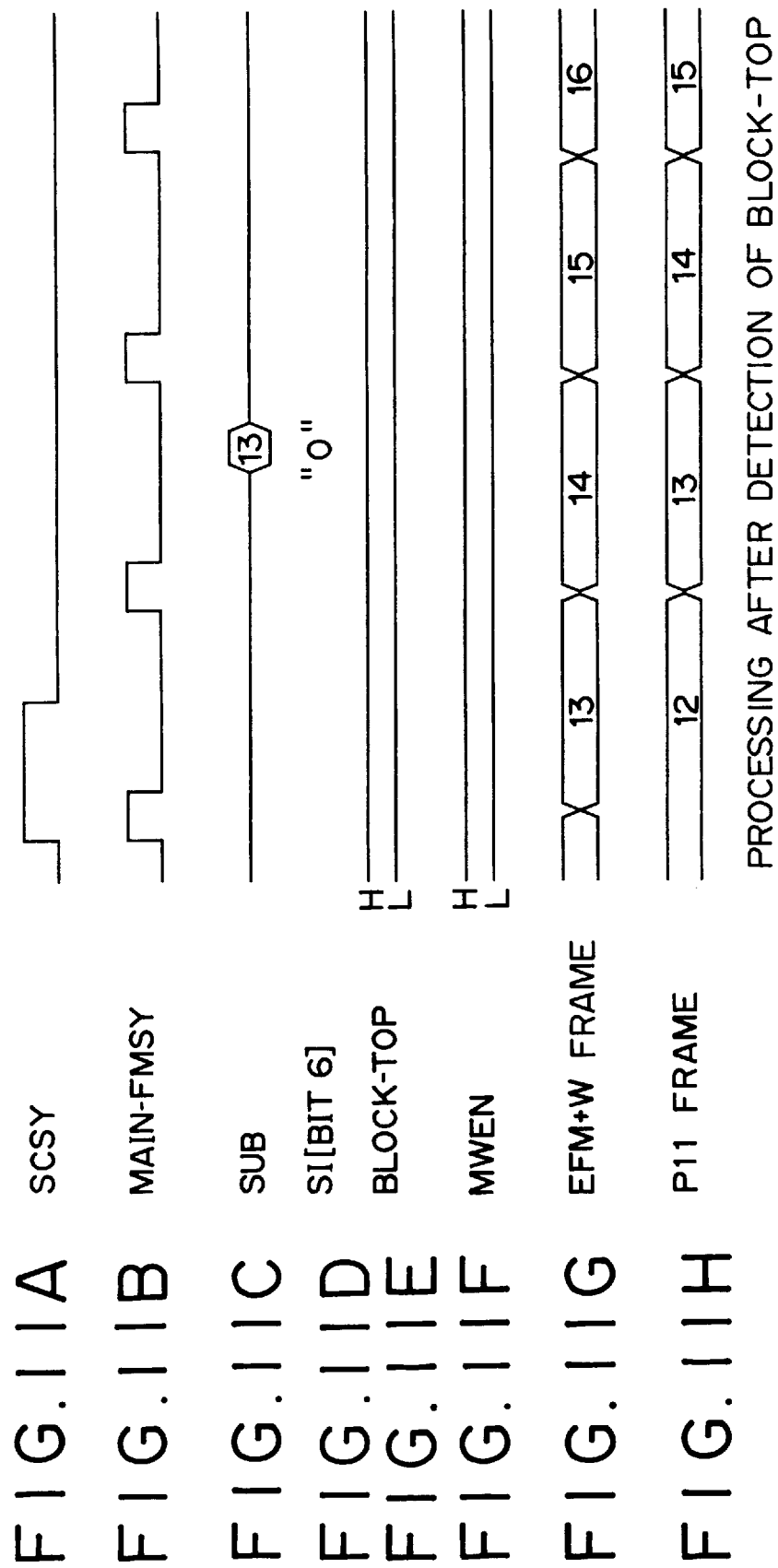
FIGS. 11A to 11H show timing charts for the processing after the block-top detection.

If the signal block-top is HIGH, the value of the EFM+W Frame is kept incrementing when the value becomes 13 or more as shown in FIG. 11. As a result, the main frame data of ECC blocks is stored in the RAM 37 at different addresses sequentially.

Subsequently, the writing of the EFM+demodulated data to the RAM 37 is performed likewise and, at the same time, the PI1 correction is performed. When the PI1 correction for one ECC block data (the data for 208 rows) is ended, the ECC processing (the PO correction) in the PO column direction is initiated.

Figure 36:
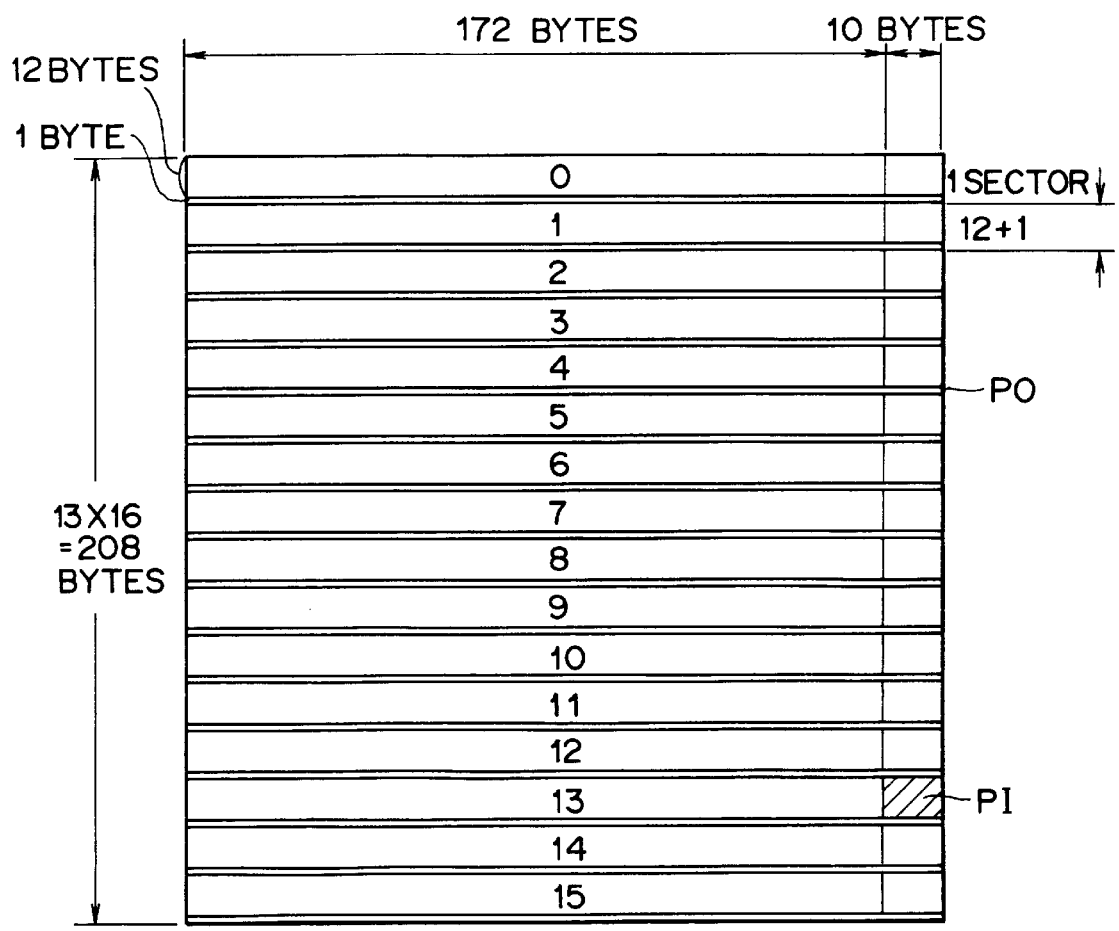
FIG. 36 is a diagram illustrating a state in which the external codes of FIG. 35 are interleaved.

It should be noted that reading data in the PO column direction requires that the interleave in the PO column be cleared (FIG. 36). Therefore, to read the column at the Nth byte shown in FIG. 5 for example, data of the column at the Nth byte down from the top is first read by skipping the interleaved PO column, and then only the code at the same Nth byte is read again to be supplied to the ECC core circuit 38.

When the ECC core circuit 38 ends the PO correction (namely, when all of 172 columns, except for the 10 PI columns on the right side of FIG. 5, have been processed), then the circuits perform the PI2 correction. It will be appreciated that the ECC processing in the PI row direction is performed twice to enhance the error correcting capability.

In the PO correction, erasure correction is performed according to the error flag (the PI1 flag) that is generated on the basis of the PI1 correction. Further, in the PI2 correction, the erasure correction is also performed by using the error flag (the PO flag) that is generated according to the result of PO correction. The erasure correction is performed to enhance the error correction capability, as with the ECC processing.

The PI data following the PI2 correction is transferred from the RAM 37 to the OCTL circuit 39, where the descramble processing on the main data is performed on a sector-by-sector basis using bits 3 through 0 of the sector information, as shown in FIG. 13. At the same time, an arithmetic operation associated with the EDC is performed in the OCTL circuit 39. Based on the result of the arithmetic operation and the presence or absence of the error flag attached to the main data, it is determined whether the sector has an error or not. Based on the result of this determination, the host CPU 40 determines whether to read the data from the optical disc 1 again. If the data is to be read again, the access to the optical disc 1 is repeated. If the data need not be read again, the sector data having an error is outputted to the multiplexed data separating circuit 8.

The ECC core circuit 38 is constituted by a general-purpose Reed-Solomon code error correcting LSI in which a code length, the number of parities, and correction modes (two modes of ordinary correction and erasure correction) can be programmed. The ECC core circuit 38 can also decode the multiple-code continuously coded data (a plurality of code series having different code lengths) in real time. It should be noted that the CXD307-111G of SONY (registered trademark) is available for the above-mentioned LSI circuit. The ASIC (Application Specific Integrated Circuit) formed with this LSI is referred to as an ECC core. This ECC core is representatively used for the ECC core circuit 38 of FIG. 2.

Next, the error correcting operation is described. FIGS. 17A–17D are timing charts during the error correcting operation. ESTT (FIG. 17A) is a control signal for indicating the start of a code (PI or PO), and ECDE (FIG. 17B) is a control signal indicating the end of the code (PI or PO). ECYE (FIG. 17C) is a control signal indicating the end of a code cycle. The control signals are supplied from the RAM controller 35 to the ECC core circuit 38 via the ECC control circuit 36. The ECC core circuit 38 identifies the data supplied from the RAM 37 based on these control signals.

As shown in FIGS. 17A–17D, the PI code is transferred during 182 clock cycles (ECCK) between the ESTT and ECDE pulses. The PO code is transferred during 208 clock cycles (ECCK) between the ESTT and ECDE pulses.

If the length is different between the codes in the PI and the PO series, the code cycle length is matched to the longer code length in either the PI or the PO series (in the present embodiment, 208 codes in the PO column). Consequently, the data (EDT) to be corrected and the error flags (PI1, PI2 and PO) for the erasure correction can be inputted in the substantially similar timing as shown in FIGS. 17A–17D regardless of the code series. It should be noted that any values can be set for the parameters, such as code length and the number of parities. Namely, to change the settings, new data is supplied to the ECC core circuit 38 when the ESTT signal is HIGH. Based on the new supplied data, the ECC core circuit 38 automatically changes the internal settings.

The result of the data correction is outputted in 477 clock cycles (ECCK), as shown by the following relation:

$$\text{throughput} = 2 \times NCYC + 3 \times PCYC + 13 = 2 \times 208 + 3 \times 16 + 13 = 477 \ (ECCK)$$

Figure 17:
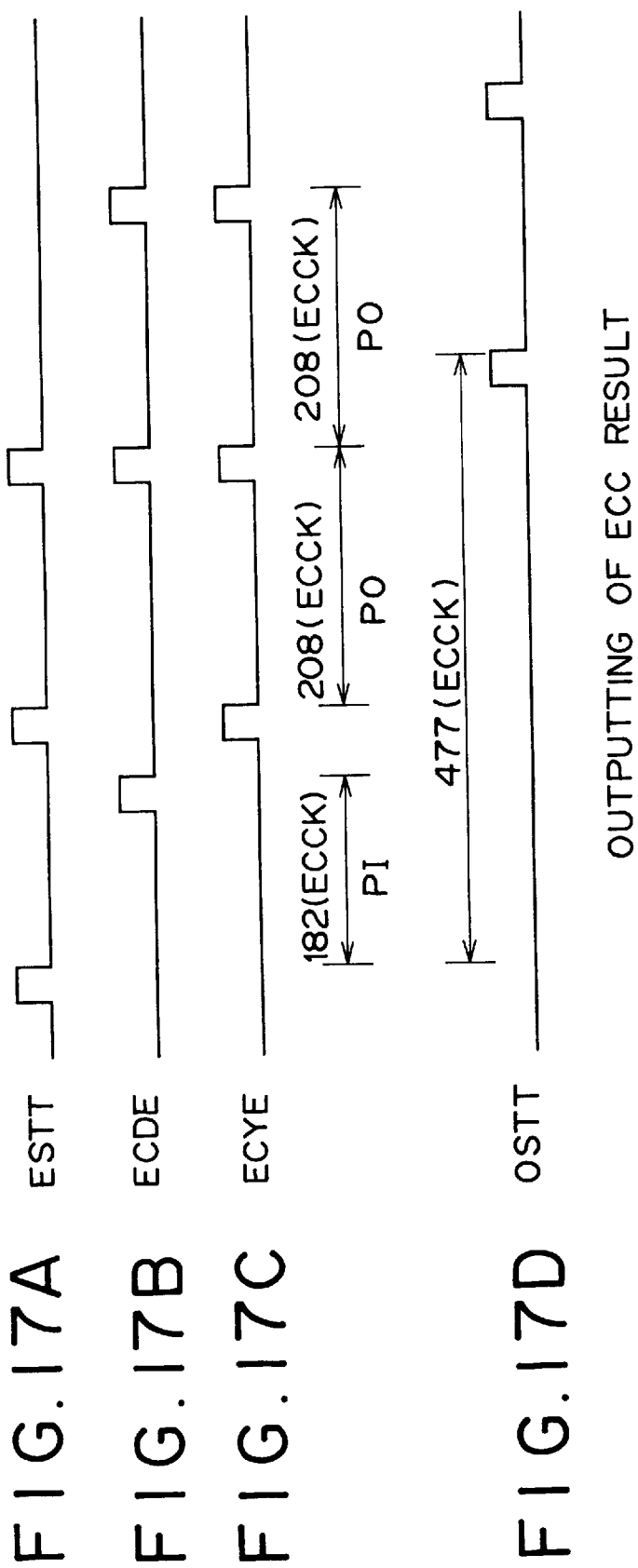
FIGS. 17A–17D show timing charts of the signals of the main portion in connection with the output of ECC processing results.

NCYC in the above-mentioned relation denotes the longer code length of the codes in PI and PO. PCYC denotes the number of parities of the longer code. As shown in FIG. 17D, OSTT is supplied from the ECC core circuit 38 to the ECC control circuit 36 by delaying the timing of ESTT (FIG. 17A) by the data output cycle. In the present embodiment, the OSTT is delayed from the ESTT by 477 clock cycles (ECCK).

Figure 18:
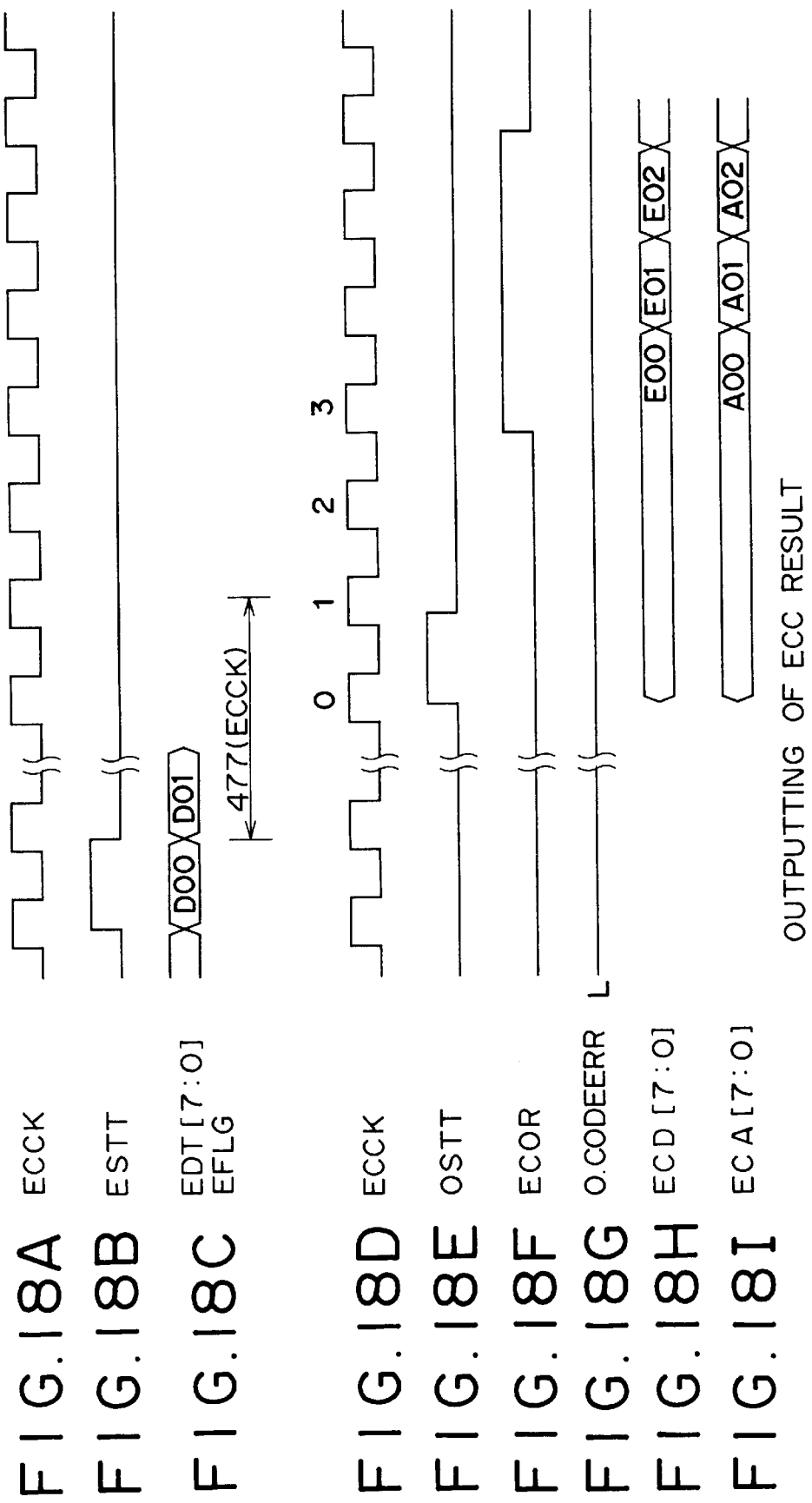
FIGS. 18A–18I show timing charts of the signals of the main portion in connection with the output of the ECC processing results.
Figure 19:
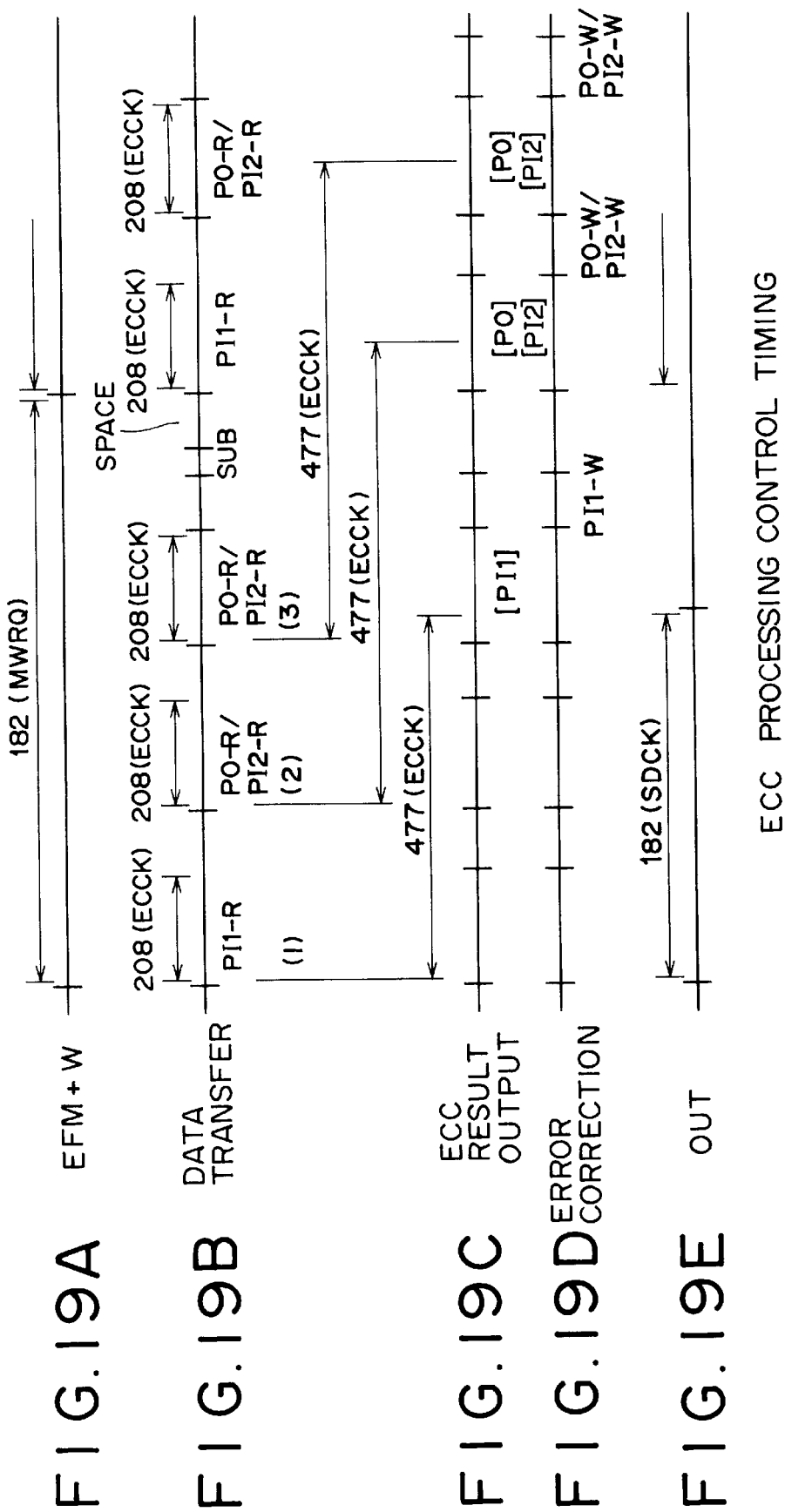
FIGS. 19A–19E show timing charts of timing control to be performed when the ECC processing is executed.

When the error detection processing has been performed and the detected error is correctable, the ECC core circuit 38 outputs O.CODEERR=LOW (FIG. 18G) to the ECC control circuit 36 when OSTT=HIGH (FIG. 18E). Then, 8-bit data indicating an error pattern (that is, the data resulting in correct data when an exclusive OR operation is performed with the error data) ECD [7:0] (FIG. 18H) and 8-bit data indicating the error position (8-bit data indicating the position (address) having an error) ECA [7:0] (FIG. 18I) are outputted when ECOR=HIGH (FIG. 18F).

It should be noted that, in the erasure correction mode, the error position ECA [7:0] data corresponding to the position at which an error flag EFLG (FIG. 18C) has been inputted is always outputted; if the data at that position is correct, the error pattern becomes ECD [7:0]=0.

If the error correction cannot be performed, the OSTT (FIG. 18E) goes HIGH and, at the same time, the O.CODEERR (FIG. 18G) becomes HIGH. The output of the O.CODEERR (FIG. 18G) is kept latched until the OSTT (FIG. 18E) goes HIGH again, while the ECOR (FIG. 18F), the ECD [7:0] (FIG. 18H), and the ECA [7:0] (FIG. 18I) are outputted until the OSTT (FIG. 18E) goes HIGH the next time.

FIGS. 19A–19E show timing control charts during the ECC processing. PI1-R, PO-R or PI2-R shown in FIG. 19B denotes the timing in which the data EDT [7:0] to be corrected and the EFLG (FIG. 18C) of the PI1, PO, or PI2 series are transferred from the RAM 37 to the ECC core circuit 38 via the ECC control circuit 36.

As shown in FIG. 19A, to write the data EFM+W (182 bytes) in one PI row from the EFM+demodulating circuit 31 to the RAM 37, an MWRQ signal is supplied 182 times. When the MWRQ signal is supplied, the EFM+demodulated data for one PI row is written to the RAM 37. While the data for one PI row is being written, the data of the ECC block already written to the RAM 37 is read and transferred to the ECC core circuit 38 via the ECC control circuit 36. Namely, while the data for one PI row is being written to the RAM 37, the data of another PI row or PO column already written is read three times quicker. Further, when the data of the PI row at the beginning of the sector is transferred, the sub code data (ID and IEC) is also read. While the write operation is performed, the read operation is stopped and vice versa.

For example, when performing PI1 correction on an ECC block, data for one PI row is read while data for one PI row is being written. Namely, data for one PI row is read from the RAM 37 and transferred to the ECC core circuit 38 via the ECC control circuit 36. In FIG. 19B, 208 clock cycles (ECCK) are used for reading the PI1-R data for the PI1 correction. This number of clock cycles (ECCKs) matches the length of the PO column. In transferring the PI row data, substantially only 182 cycles of ECCK are used, while the rest of the ECCK is left unused.

When the transfer of PI1-R has not been completed yet, transfer of the PO-R data of the PO series or the PI2-R data of the PI2 series is disabled. In such a case, no data is transferred during the next 2 by 208 clock cycles (ECCK).

In the next 182-MWRQ interval, only the PI1-R is transferred. Subsequently, when the data transfer of the entire 208 PI rows has been completed, the PI1-R data is first transferred in the next 182-MWRQ interval, followed by the PO-R data twice (the PO data for 2 columns is transferred). However, the PI1-R data (transferred in the same 182-MWRQ interval as the PO-R) provides the data of the PI row of the next ECC block.

The above-mentioned operations are performed in the 182-MWRQ interval and, when the PO data for a total of 172 columns has been transferred, the PI2-R data of PI2 series is transferred. This PI2-R data is transferred in accordance with the same timing as the transfer timing for the PO-R data shown in FIG. 19(*b*). The PI1-R data during this timing provides the data for the next ECC block.

It should be noted that the ECCK (FIG. 18A) is outputted from the RAM controller 35 to the ECC core circuit 38 only during the data transfer interval. Also, as described above, the correction result of the transferred data is outputted 477 clock cycles (ECCKS) after the data input. Therefore, the result of the determination (FIG. 19C) whether data of a certain series has an error is outputted when the data of a second series after that series is transferred (FIG. 19B). This output is stored in an ERR FIFO circuit 36*b* (FIG. 20) to be described later.

When the data to be error-corrected is inputted from the RAM 37 into the ECC control circuit 36 as described above, the ECC control circuit performs PI1 correction on the data for one PI row, for example, and outputs the correction result 477 clock cycles (ECCKS) thereafter (FIG. 19C). The correction result is transferred to the ERR FIFO 36*b*, which provides buffer for the ECC control circuit 36, and is temporarily stored therein. This data is further read from the ERR FIFO 36*b* and written to the RAM 37 again as the error-corrected data as PI1-W data shown in FIG. 19D. Likewise, the data after the PO correction or PI2 correction is written to the RAM 37 as PO-W or PI2-W data, respectively.

Thus, the error-corrected data written to the RAM 37 is further read for each PI row in a period of 182 clock cycles (SDCKS) as shown in FIG. 19E and outputted from the OCTL circuit 39.

Figure 20:
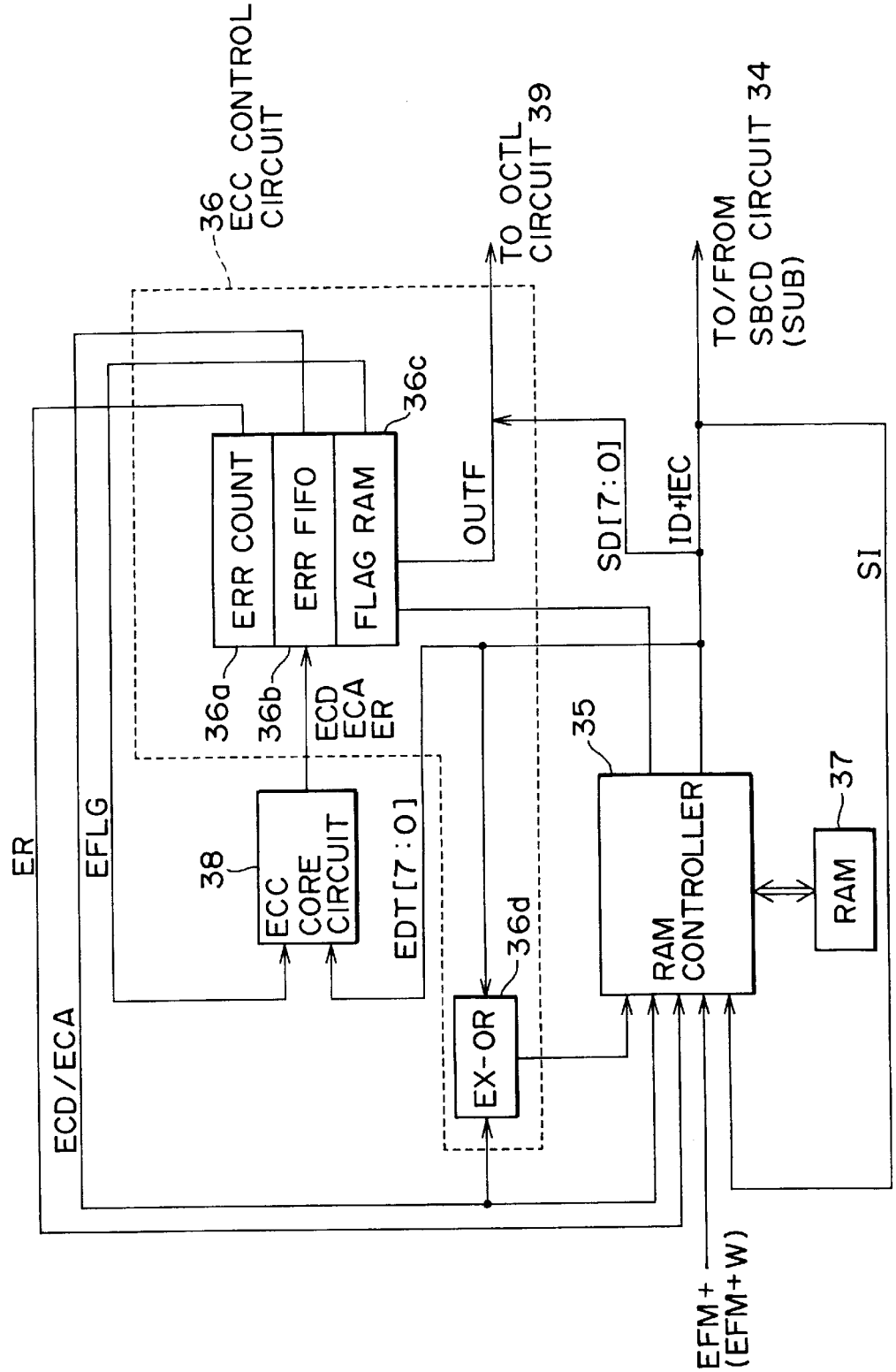
FIG. 20 is a block diagram of data flow during the error correction.

FIG. 20 is a block diagram illustrating the signal flow during the error correction processing. It should be noted that, with reference to FIG. 20, components similar to those described with reference to FIG. 2 are designated with the same reference numerals and the description of such components will be omitted accordingly.

As shown in FIG. 20, the ECC control circuit 36 includes an ERR COUNT 36*a*, the ERR FIFO 36*b*, a FLAG RAM 36*c*, and an EX-OR (exclusive OR) circuit 36*d*. The demodulated data outputted from the EFM+demodulating circuit 31 is written to the RAM 37 under the control of the RAM controller 35. The SUB data (ID and IEC) stored at the beginning of each sector is read from the RAM 37 and transferred to the SBCD circuit 34. The SBCD circuit 34 generates the sector information SI as shown in FIG. 13. This sector information SI is transferred from the SBCD circuit for storage in the RAM 37.

The RAM controller 35 supplies the data for one PI row stored in the RAM 37 to the ECC core circuit 38 via the ECC control circuit 36 (the error correcting means) as the error-correction data EDT on a 8-bit basis (in FIG. 20, the EDT data is supplied directly to the ECC core circuit 38 for simplicity). When the data for one PI row arrives, the ECC core circuit 38 generates 8-bit error-correction data ECD (FIG. 18H) and 8-bit error-correction address ECA (FIG. 18I) using the PI code. The error-correction ECD data and ECA address are transferred from the ECC core circuit 38 to the ERR FIFO 36 to be written thereto.

Next, in order to perform the error correction, the RAM controller 35 reads the EDT data of the PI row and supplies the read data to the EX-OR circuit 36d. The error-correction data ECD and the error-correction address ECA are supplied to this EX-OR circuit 36d from the ERR FIFO 36b. For the error correction, the EX-OR circuit 36d performs an exclusive-OR operation in the bit designated by the error-correction address ECA between the error-correction data ECD and the data EDT read by the RAM controller 35. The data on which this error correction has been performed is then written from the EX-OR circuit 36d back to the RAM 37 via the RAM controller 35.

Based on the ECD and the ECA data, the ECC core circuit 38 generates an error correction result ER composed of 8-bit data, as shown in FIG. 21, and supplies the ER to the ERR COUNT 36a of the ECC control circuit for storage therein. Then, this 1-byte error correction result ER is written to the RAM 37 via the RAM controller 35 in correspondence with the PI row, as shown in FIG. 5.

The bits constituting the error correction result ER represent the following information, as shown in FIG. 21.

Bit 7: 0=correctable; 1=uncorrectable (1 when the error correction of that series cannot be performed).

Bit 6: 0=PI; 1=PO (information bit for determining whether that series is PI or PO).

Bit 5: 0=PI1; 1=PI2 (information bit for determining whether that series is PI1 or PI2).

Bit 4: error correction count (the value of bit 5 (MSB) of the number of error corrections).

Bit 3: error correction count (the value of bit 4 of the number of error corrections).

Bit 2: error correction count (the value of bit 3 of the number of error corrections).

Bit 1: error correction count (the value of bit 2 of the number of error corrections).

Bit 0: error correction count (the value of bit 1 (LSB) of the number of error corrections).

An error flag (bit 7 of the error correction result ER) indicating the result of the determination whether the data is uncorrectable by the PI1 correction is stored not only in the ERR COUNT 36a but also in the FLAG RAM 36c as part of the error correction result ER.

The PI1 correction as described above is performed on 208 PI rows shown in FIG. 5.

Next, the RAM controller 35 reads 208 bytes of the first PO column from the RAM 37 and supplies this data (as EDT) to the ECC core circuit 38 via the ECC control circuit 36. The PI1 flag written to the FLAG RAM 36c is also read and supplied to the ECC core circuit 38. Using the parity PO and the PI1 flag, the ECC core circuit 38 generates the ECD and ECA for the regular correction or erasure correction. The ECD and ECA data is supplied from the ECC core circuit 38 to the ERR FIFO 36b of the ECC control circuit 36 to be stored therein. Also, the ECC core circuit 38 transfers the error correction result ER of that PO column generated by the ECC core circuit (based on the ECD and ECA data) to the ERR COUNT 36a to be stored therein. The PO flag corresponding to bit 7 of the error correction result ER is also written to the FLAG RAM 36c.

The EDT data of the PO column read from the RAM 37 is output to the EX-OR circuit 36d. The ECD and the ECA are also output from the ERR FIFO 36b to the EX-OR circuit 36d. The EX-OR circuit 36d performs an exclusive OR operation between the ECD and the EDT for the error correction. The error-corrected data is then written back to the RAM 37.

The error correction result ER of the PO column is read from the ERR COUNT 36a for storage in the RAM 37. The error correction result ER of the PO column is sequentially written to the positions corresponding to 172 PI rows from the top, as shown in FIG. 5.

The PO correction described above is performed on the 172 PO columns.

During the PI2 correction, the data for the first PI row is read from the RAM 37 (after the PI1 correction and the PO correction) to be supplied to the ECC core circuit 38. The PO flag previously written to the FLAG RAM 36c is also read and supplied to the ECC core circuit 38. Using the PO flag and the parity PI, the ECC core circuit 38 generates ECD, ECA data and supplies the generated ECD and ECA data to the ERR FIFO 36b of the ECC control circuit 36.

The ECD and ECA data provided to the ERR FIFO 36b are output to the EX-OR circuit 36d for performing an exclusive OR operation for error correction between the PI row data retrieved from the RAM 37 and the ECD data. The error-corrected data is then supplied from the EX-OR circuit 36d back to the RAM 37 via the RAM controller 35.

The ECC core circuit 38 also generates the error correction result ER, based on the ECD and ECA data, and supplies the generated ER to the ERR COUNT 36a of the ECC control circuit 36 for storage therein. The PI2 flag corresponding to bit 7 is also written to the FLAG RAM 36c.

The error correction result ER of the PI2 row written to the ERR COUNT 36a is read from the ERR COUNT 36a for storage in the RAM 37. The error correction result ER of the PI2 row is written to the positions corresponding to 208 PI rows of the ECC block.

The PI2 correction described above is performed on all 208 PI rows.

FIGS. 22A–22G are timing charts for the bus arbitration during the RAM 37 access. EFMREQ (FIG. 22A) denotes a signal to be outputted to the RAM controller 35 when the EFM+demodulating circuit 31 requests the writing of EFM+ demodulated data to the RAM 37. OUTREQ (FIG. 22B) denotes a signal to be outputted to the RAM controller 35 when the OCTL circuit 39 requests the reading of the ECC-processed data from the RAM 37. ECCREQ (FIG. 22C) denotes a signal to be outputted from the ECC control circuit 36 to the RAM controller 35 when the ECC control circuit 36 transfers data to the ECC core circuit 38 and accesses the RAM 37 for error correction, accesses the RAM 37 to obtain the error-corrected data, or accesses the RAM 37 to perform SUB transfer (transfer of ID and IEC) to the SBCD circuit 34.

The RAM controller 35 sets priority levels for these three signals beforehand. If the above-mentioned requests are made simultaneously, the RAM controller sequentially outputs ACK (acknowledge) signals for granting access to the RAM 37 according to the priority levels. EFMACK (FIG.

22D), OUTACK (FIG. 22E), and ECCACK (FIG. 22F) designate acknowledge signals for the EFMREQ, the OUTREQ, and ECCREQ, respectively. In the present embodiment, the highest priority is given to the OUTREQ, the next priority is to the EFMREQ, and the lowest priority is assigned to the ECCREQ. Therefore, as shown in FIGS. 22A–22G, the RAM controller 35 outputs the ACK signals for the REQ signals according to these priority levels. These signals are transferred in synchronization with the C11M (FIG. 22G), which is the system clock.

Thus, in the present embodiment, the right to access the RAM 37 is given to one of the EFMREQ, ECCREQ, and OUTREQ signals during each predetermined cycle. It should be noted that this cycle can be altered according to the structure and/or type of the RAM 37, or the access speed thereof.

FIG. 23 indicates the number of times the RAM 37 is accessed when the PI1 correction, PI2 correction, and PO correction are performed on one ECC data block. The number of times the access to the RAM 37 is required to perform the PI1 correction, PO correction, and PI2 correction is 214716 per one ECC block, and an average of 1033 for one main frame. For example, the number of times the RAM 37 is accessed when writing the EFM+demodulated data is 182 per main frame and 37856 (that is, 182×208) per block, because the execution cycle length of ECC is 208 bytes (208 main frames). The number of access times required for each operation is calculated, and a total of the calculations provides the above-mentioned values, as illustrated in FIG. 23.

FIGS. 24A–24F are timing charts during the output of the error correction result ER from the RAM 37 via the OCTL circuit 39. A portion preceding the interval of 182 clock cycles (SDCK) of FIG. 19E is shown with the time axis extended. SDCK (FIG. 24A) denotes a clock signal for the ER data to be outputted as stream data. SINF (FIG. 24B) denotes a sector information strobe signal, which goes HIGH at the beginning of a sector and indicates that the data to be transferred is sector information (SI). ESTB (FIG. 24C) is an error correction result strobe signal, which, when set to HIGH, indicates that the error correction result ER has been transferred. It should be noted that, in each PI row, one byte of the error correction result ER is assigned to each PI1 correction, PO correction, and PI2 correction, amounting to a total of three bytes. This data is outputted in the order in which it is stored as shown in FIG. 5, so that checking bits 5 and 6 (FIG. 21) of the error correction result ER can determine which series this result (data) belongs to.

DSTB (FIG. 24D) is a data strobe signal that goes HIGH when the signal SD [7:0] (FIG. 24E) is main data. Three signals SINF, ESTB, and DSTB are generated by the OCTL circuit 39. It should be noted that, as shown in FIG. 24E, the sector information SI and the error correction result ER are outputted immediately before the data in the PI row direction is sent during the 182 clock cycles (SDCKS).

OUTF (interpolation flag of FIG. 24F) is an error flag for the main data and outputted for the failing main data based on the uncorrectable PI and PO flags stored in the FLAG RAM 36c, as shown in FIG. 20.

Based on the bits 4 and 5 (FIG. 13) of the sector information generated by the SBCD circuit 34, the OCTL circuit 39 determines whether the decoded sector data is to be outputted. The bits 4 and 5 of the sector information denote the end sector and the start sector, respectively, as shown in FIG. 13. Therefore, the OCTL circuit 39 outputs the data of the sector with bit 4=0 and bit 5=1, as the data of the sector to be outputted.

Further, the OCTL circuit 39 also determines whether the presence or absence of the error flag of main data and the result of EDC satisfy the condition predetermined by the host CPU 40. If the predetermined condition is satisfied, the OCTL circuit 39 outputs the decoded data. If not, the OCTL circuit 39 stops outputting the decoded data and notifies the host CPU 40 of an abnormal condition.

The data output conditions are set as follows, for example:
(1) The data of a sector for which the output is designated.
(2) No error is detected based on the result of ECD.
(3) No error flag is added to main data.

The data that satisfies these conditions is eventually outputted. It should be noted that, regardless of the above-mentioned conditions, the outputting of data may be forcibly inhibited by the host CPU 40. It will be appreciated that the output conditions are not limited to those mentioned above.

Figure 25:
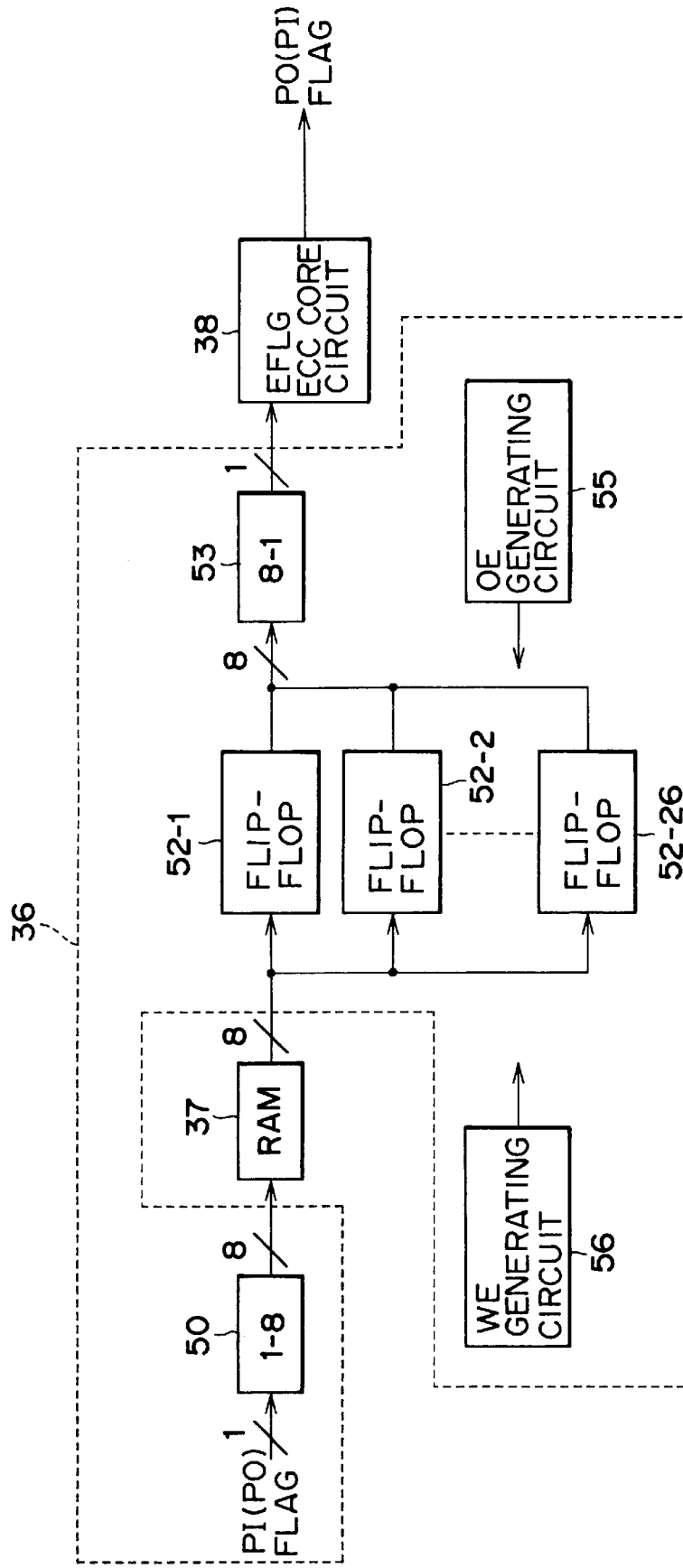
FIG. 25 is a block diagram of a circuit for error flag reading.

Next, the interpolation flag is described. The PI1 flag, the PI2 flag, and the PO flag generated in correspondence with the PI1 correction, PI2 correction, and PO correction, respectively, are stored in the FLAG RAM 36c of the ECC control circuit 36. FIG. 25 is a block diagram illustrating the structure of the ECC control circuit 36 of the portion for storing data in the FLAG RAM 36c into a predetermined 8-bit wide area of the RAM 37.

In FIG. 25, a 1-8 converting circuit 50 converts a 1-bit PI or PO flag (bit 7 in FIG. 21) into 8-bit parallel data for each row or column read from the FLAG RAM 36c. The RAM 37 stores the converted 8-bit parallel data. Flip-flops 52-1 through 52-26 are adapted to hold the data in a FIFO manner. An 8-1 converting circuit 53 converts 8-bit data into 1-bit data. A WE generating circuit 56 controls the operation for writing the data to the flip-flops 52-1 through 52-26. An OE generating circuit 55 controls the operation for reading the data from the flip-flops 52-1 through 52-26.

The operation in accordance with FIG. 25 is described next. The 1-bit PI flag (the PI1 or PI2 flag) or PO flag inputted from the FLAG RAM 36c is converted by the 1-8 converting circuit 50 into 8-bit parallel data. Namely, data is collected from the start of the PI row of each ECC block on an 8-row basis to be converted into byte data. The resultant byte data is stored in the RAM 37 such that it can be accessed along with the data of each ECC block.

One ECC block has 208 PI rows and the PI flag of each PI row is 1 bit long. Therefore, a storage area of 26 bytes (that is, 208/8) is required for storing the PI flags. One ECC block has 172 PO columns. Therefore, a storage area of approximately 22 bytes (that is, equal to 21.5=172/8) is required for storing the PO flags.

Thus, the data stored in the RAM 38 on an 8-bit basis is read by the RAM controller 35 and, under control of the WE generating circuit 56, stored in the flip-flops 52-1 through 52-26. The 8-1 converting circuit 53 converts the 8-bit data outputted from the flip-flops 52-1 through 52-26 under control of the OE generating circuit 55 into 1-bit data. The obtained 1-bit data is supplied to an EFLG terminal, which is the error flag input terminal of the ECC core circuit 38 in correspondence with the PI rows (or PO columns) of the transferred data series.

The erasure correction is performed when the PO correction and PI2 correction are performed. Since the PO correction and PI2 correction are sequentially performed on an ECC block basis, the circuits of FIG. 25 can be shared between the PO correction and PI2 correction. However, the timing at which the data is read from the flip-flops 52-1 through 52-26 by the OE generating circuit 55 and the timing at which the data is read from the 8-1 converting circuit 53 need to be altered between the PI2 correction and PO correction.

Figure 26:
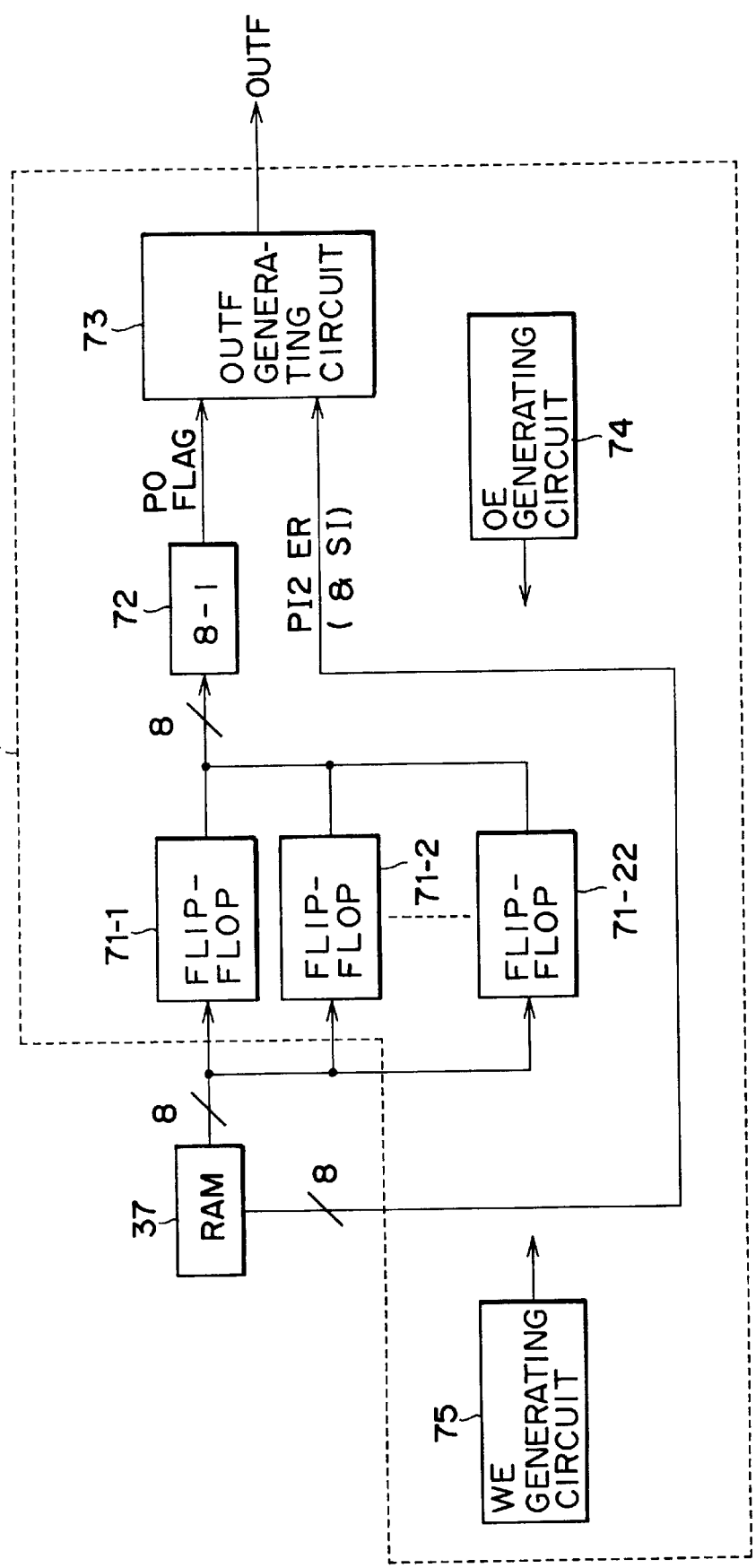
FIG. 26 is a block diagram of a circuit for interpolation flag storage or reading.

FIG. 26 is a block diagram illustrating a representative structure of a portion of the ECC control circuit 36 for generating and reading an interpolation flag (OUTF). As shown in the figure, the interpolation flag reading circuit includes flip-flops 71-1 through 71-22 for storing 8-bit data from the RAM 37 in a FIFO manner, an 8-1 converting circuit 72 for converting the 8-bit data from the flip-flops 71-1 through 71-22 into 1-bit data, an OUTF generating circuit 73 for generating the OUTF flag (that is, the interpolation flag), a WE generating circuit 75 for controlling the writing of data to the flip-flops 71-1 through 71-22, and an OE generating circuit 74 for controlling the reading of data from the flip-flops 71-1 through 71-22.

The operation of the embodiment of FIG. 26 is as follows. The 8-bit data of the PO flag read by the RAM controller 35 is supplied to the flip-flops 71-1 through 71-22 under the control of the WE generating circuit 75 for storage on an 8-bit basis. Then, the PO flag data is read under the control of the OE generating circuit 74 to be converted by the 8-1 converting circuit 72 from the 8-bit data to the 1-bit data.

The 8-bit PI2 correction error result ER read from the RAM 37 and 8-bit sector information SI are also supplied to the OUTF generating circuit 73. The OUTF generating circuit 73 generates the interpolation flag (OUTF) according to the PO flag, and the PI2 flag (bit 7), the error correction count (bits 4 through 0), and the interpolation flag generating mode (bit 7) of the sector information SI of the PI2 correction error result ER supplied from the 8-1 converting circuit 72. Details of the processing for generating the interpolation flag will be described later with reference to the flowcharts of FIGS. 31 and 32.

It will be appreciated that, in the preferred embodiments of FIGS. 25 and 26, the error flags may be stored in a storage device other than the RAM 37. In these preferred embodiments, the FIFO-type storage devices (the flip-flops 52-1 through 52-26 and 71-1 through 71-22) are used. It will also be appreciated that storage devices of other types may be used. Further, if the RAM 37 is 1 bit wide, the 1-8 converting circuit 50 and the 8-1 converting circuits 53 and 72 may be unnecessary in the ECC control circuit 36.

The following description explains a method of setting the operation mode of the ECC core circuit 38 and a method of determining whether data is uncorrectable.

Figure 27:
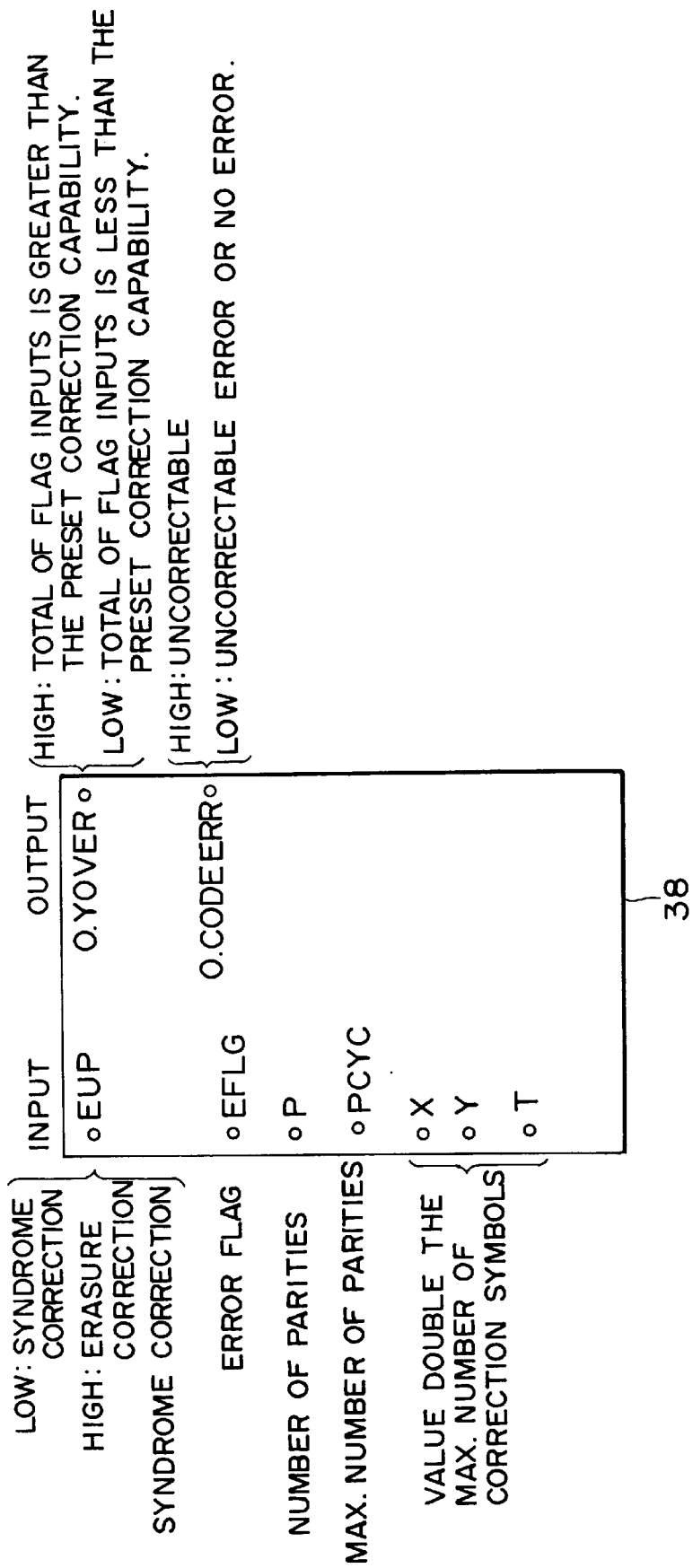
FIG. 27 is a diagram of input and output terminals of an ECC core circuit.

First, the operation mode (the error correcting mode) of the ECC core circuit 38 will be described. As shown in FIG. 27, the ECC core circuit 38 has terminals EUP, EFLG, P, PCYC, X, Y, and T for input associated with the operation mode, and terminals O.YOVER and O.CODEERR for outputting signals associated with the operation mode.

The error correction mode of the ECC core circuit 38 can be altered by a signal that is applied to the EUP terminal. That is, when the signal supplied to the EUP terminal is LOW, only syndrome correction (that is, the ordinary correction) is performed. When the signal is HIGH, the erasure correction is first performed and, if the correcting capability have enough margin, the ordinary correction follows.

The output of the O.YOVER terminal goes HIGH when the number of flags inputted to the EFLG terminal exceeds a predetermined value, thereby indicating that the error correction cannot be performed. It should be noted that, if the output of the O.YOVER terminal goes HIGH when the output of the EUP terminal is HIGH (that is, the state in which the erasure correction+ordinary correction mode is selected), the ordinary correction is performed instead of indicating that the error correction cannot be performed. Consequently, the data for which an error flag is set due to a cause other than an error can be error-corrected by the ordinary error correction.

It should be noted that the ECC control circuit 36 switches between the states of the EFLG signal (the signal corresponding to the error flag) which is outputted via the EFLG terminal (FIGS. 25 and 27) of the ECC core circuit 38 according to the number of errors, as will be described later.

Since the ECD includes an empty flag (ECD=0), the data for which ECD are all 0 is regarded as correct data, and therefore no correction is performed on that data. Consequently, the number of times the data is corrected is obtained by subtracting the number of empty flag ECD from the number of outputs of error position ECA or error pattern ECD.

If the erroneous correction occurs in the erasure correction mode, the ECC core circuit 38 outputs the O.CODEERR signal as HIGH and O.YOVER as LOW. Therefore, an occurrence of the erroneous correction can be detected by referring to these signals.

For example, if the erasure correction is performed 8 times in the PI2 correction and the number of inputs of the PO flag is 7, O.CODEERR is set to HIGH and O.YOVER is set to LOW. This indicates that one or more data errors with no flag added exist.

If there is an uncorrectable error at a position where no flag is set, it is indicated that the erroneous correction has been caused in the PO correction. Therefore, OUTF is set to 1 because an error occurred at the position where no PO flag has been set.

The signal levels (logic levels) of O.CODEERR and O.YOVER are recorded in the RAM 37 as flags to be used for generating an interpolation flag by the ECC control circuit 36. For example, if the PI1 correction, PO correction, and PI2 correction are performed, the erroneous correction can be determined by setting the correction count (bits 4 though 0 of FIG. 21) of the error correction result ER of the PI2 correction as follows.

(A) If O.CODEERR="LOW" and O.YOVER="LOW", the correction count of correction result is an actual error correction count (the correction was performed).

(B) If O.CODEERR="HIGH" and O.YOVER="HIGH", the correction count of correction result is 0 (the correction was not performed).

(C) If O.CODEERR="HIGH" and O.YOVER="LOW", the correction count of correction result is 1F(H) (the erroneous correction occurred).

It should be noted that the setting of 1F(H) denotes a prohibited correction count, being the maximum value that can be represented with 5 bits.

The following detailed description explains a method of generating an error flag by the ECC control circuit 36 based on the output of the ECC core circuit 38 with reference to FIGS. 28 and 29.

The parameters (that is, signals to be applied to the terminals of the ECC core circuit 38) shown in FIGS. 28 and 29 are as follows:

The input side:

P=the number of parities of the PI or PO series.

PCYC=the maximum value for the number of parities in each series.

X, Y, T=a value double the maximum value of the number of correction symbols as normal.

The output side:

O.CODEERR=the output terminal of a signal that indicates whether the series is correctable (LOW: a correctable error is included or no error is included, HIGH: uncorrectable).

O.YOVER=the terminal that goes HIGH when the total number of ERROR signals (the number of flag inputs) of the series exceeds the limit of correction capability.
Correction result:
O=error correction is performed according to the output states of O.CODEERR and O.YOVER.
X=error correction is not performed.

In the case of "X", no correction is performed, so that the error flag of that series is HIGH.

As shown in FIG. 28, when the PI1 correction is performed, the ECC control circuit 36 sets the ERROR flag for input to the terminal EFLG of the ECC core circuit 38 to LOW. At this time, the ordinary correction is performed. When performing the PO correction, the ECC control circuit 36 sets the ERROR flag to the PO flag such that the erasure correction is performed. Hence, the PI flag (as shown in FIG. 28) becomes the PI1 flag when ERROR=LOW and becomes the PO flag when ERROR=PO flag.

The ECC control circuit 36 sets the parameters P, PCYC, X, Y, and T as shown in FIG. 28. If LOW is outputted from the O.CODEERR and O.YOVER terminals, the PI or PO flag is set to LOW by the ECC control circuit 36. If HIGH is outputted from the O.CODEERR terminal, and LOW from the O.YOVER terminal, the ECC control circuit 36 does not perform the error correction and sets the PI or PO flag to HIGH. This indicates that the erroneous correction has occurred. Further, if HIGH is outputted from the O.CODEERR and O.YOVER terminals, the ECC control circuit does not perform the error correction and sets the PI or PO flag to HIGH. This indicates that the error correction could not be performed.

Referring to FIG. 28, the parameters X, Y and T can be set to 10 for the correction capability. Alternatively, these parameters may be set to 8, as shown in FIG. 28.

When performing the PO correction (the erasure correction) as shown in FIG. 29, the ECC control circuit 36 sets the ERROR flag for the EFLG terminal of the ECC core circuit 38 to PI1 flag. Then, if the outputs of the O.CODEERR and the O.YOVER terminals are both LOW, the ECC control circuit 36 performs the error correction and sets the PO flag to LOW (FIG. 29). If the two outputs of the ECC core circuit 38 are HIGH and LOW (erroneous correction), or HIGH and HIGH (uncorrectable), respectively, the ECC control circuit 36 does not perform the error correction and sets the PO flag to HIGH.

FIG. 30 shows the methods for generating an interpolation flag. Namely, in the preferred embodiment of FIG. 30, the following methods may be selected: [1] a method in which an AND operation between the PO flag and the PI2 flag provides an interpolation flag; [2] a method in which an OR operation between PO flag and PI2 flag provides an interpolation flag; [3] and a method in which an AND operation between PO flag and PI2 flag provides an interpolation flag (if no erroneous correction was caused by PI2 correction), and an OR operation between PO flag and PI2 flag provides an interpolation flag (if the erroneous correction was caused by PI2 correction).

The two methods of the above-mentioned three methods are made to correspond to 1 and 0 of the interpolation flag generating mode setting bit (bit 7 of the sector information SI in FIG. 13). Thus, an interpolation flag is generated according to the mode corresponding to bit 7 of the sector information SI.

As described above, by generating the interpolation flag using an AND operation or an OR operation between the PO flag and the PI2 flag, the data having no error can be used without interpolation.

In the above-mentioned embodiment, the mode selection is made based on bit 7 of the sector information. It will be appreciated that the modes can be forcibly changed by the host CPU 40.

Figure 31:
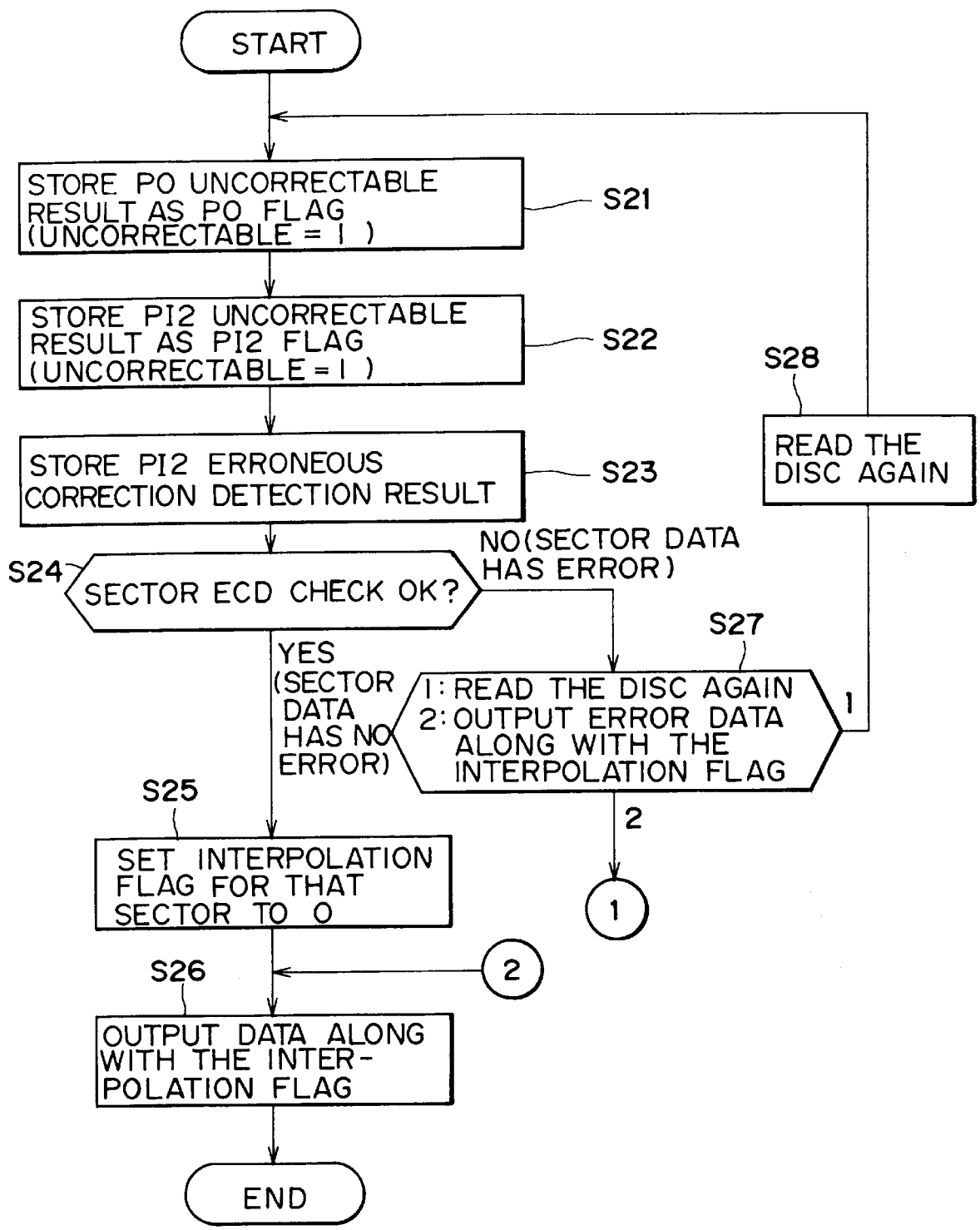
FIG. 31 is a flowchart of the operation to be performed in the decoding apparatus according to the present invention.
Figure 32:
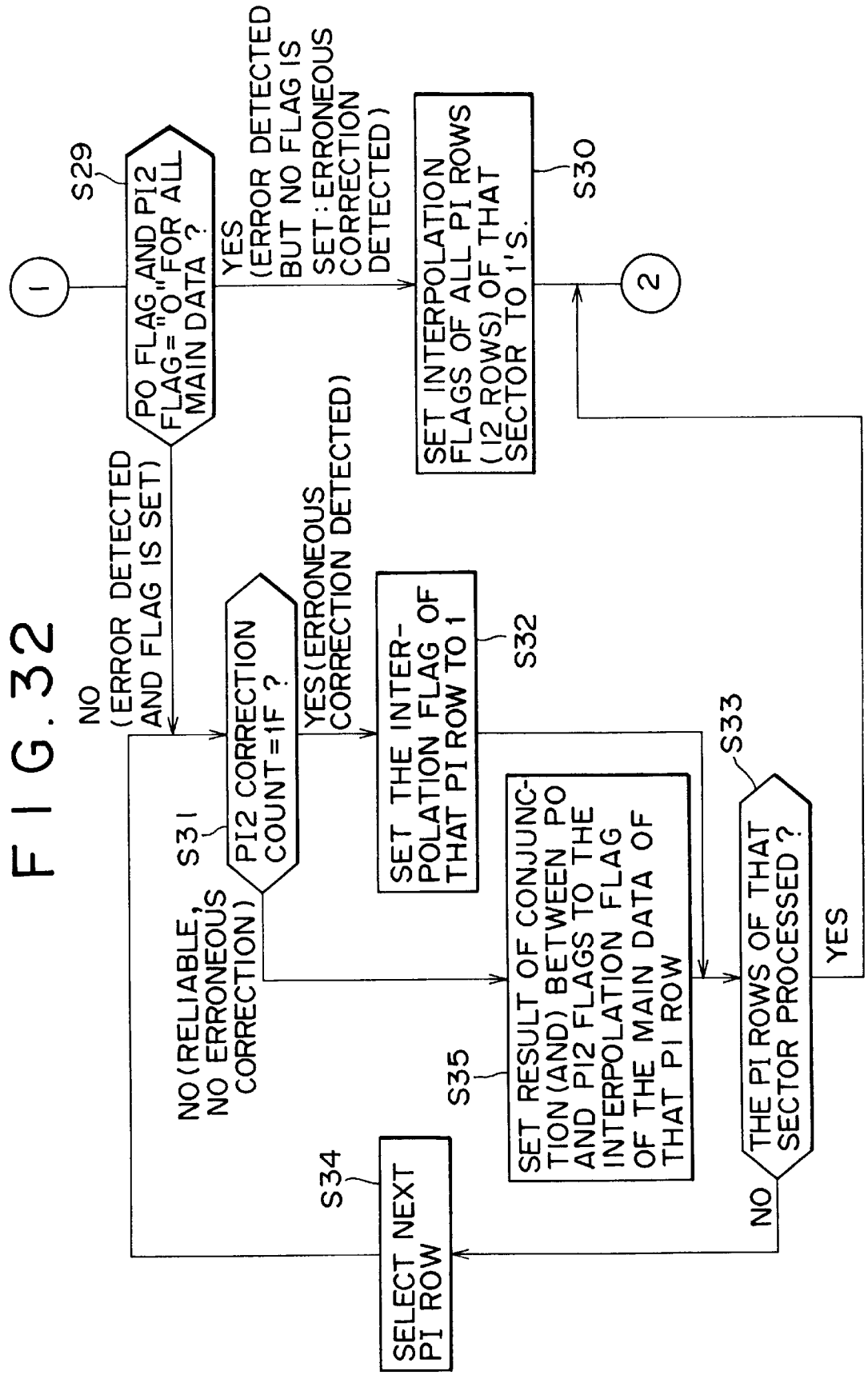
FIG. 32 is a continuation of the flowchart of FIG. 31.

The flowcharts in FIGS. 31 and 32 show the sequencing steps for generating the interpolation flag. In step S21, the ECC control circuit 36 sets the 1-bit PO flag to 1 for the 1-byte data for which the error correction cannot be performed, and sets the PO flag to 0, otherwise. The flag is stored in the RAM 37. Then, in step S22, the ECC control circuit 36 sets the PI2 flag to 1 for the data for which the error correction cannot be performed, and the PO flag to 0 otherwise. This flag is also stored in the RAM 37.

Further, in step S23, the detection result indicating whether the erroneous correction occurred in the PI2 correction is stored in RAM 37. Namely, as shown in FIG. 28, if the erroneous correction has occurred in the PI2 correction (the erasure correction), the O.CODEERR terminal outputs HIGH signal level, and the O.YOVER terminal outputs LOW signal level, so that the ECC control circuit 36 reads the states of these signals and stores them in the RAM 37.

In step S24, the OCTL circuit 39 checks the ECD of the sector. If no error is found in the sector, the process continues with step S25. In step S25, the interpolation flag for that sector is set to 0. If the interpolation flag has been set to 0 beforehand and is set to 1 only when the error is found, no special processing needs to be performed in this step. Then, in step S26, the data is outputted along with the interpolation flag.

Namely, as shown in FIG. 1, a 1-bit interpolation flag is outputted for 1-byte main data. In one ECC block, there are 192×172 bytes of main data, so that there are 192×172 interpolation flags.

In step S24, if the checking of the ECD of the sector indicates an error in that sector, the processing in step S27 is carried out. In step S27, the host CPU 40 selects between (1) reading the optical disc 1 again; and (2) outputting the error data with an interpolation flag. In option (1), in step S28, the host CPU 40 reproduces the data including that sector again. Then, the processing of step S21 and the subsequent processing are performed on the reproduced data.

In step S27, if option (2) is selected, the processing in step S29 is executed. In step S29, AND operations are performed between the PO flags and the PI2 flags corresponding to all of the main data (12×172 bytes) of the sector, and it is determined whether all AND operations resulted in 0. In step S29, if the AND operations between the PO flags and the PI2 flags of the main data are 0, the flag indicating the presence of an error is not set although the error exists, because the checking of the ECD of the sector has indicated that this sector has an error. Namely, in this case, the error correction has been performed in the PI1 correction, PO correction, and PI2 correction. Therefore, in this case, the process goes to step S30, where the interpolation flags of all PI rows (12) of that sector are set to 1. That is, the interpolation flags of 12 by 172 bits are all set to 1. Then, in step S26, the main data is outputted along with the interpolation flags from the OCTL circuit 39.

In step S29, if it is determined that the AND operations between the PO flags and the PI2 flags of all main data are not 0 (that is, if the AND operation between the PO flag and the PI2 flag of at least one byte of main data is 1), the processing in step S31 is carried out. In this step, it is determined whether the correction count of the PI2 correction is 1F(H). Namely, as described with reference to FIGS. 25 and 27, if the O.CODEERR terminal of the ECC core circuit 38 outputs HIGH signal level, and the O.YOVER terminal outputs LOW signal level, the erroneous correction is indicated, so that a predetermined value (in this case, 1F(H)) that is higher than the actual correction capability is set to the correction count (bits 4 through 0 of FIG. 21) of the error correction result ER. If the erroneous correction occurred in the PI2 correction, the correction count of the PI2 correction is set to 1F. In step S31, if the correction count of the PI2 correction in the first PI row is 1F (that is, if the erroneous correction has occurred in the PI2 correction), the processing continues with step S32. In this step, the interpolation flags (1 by 172 bits) of the PI rows (for which the correction count of the PI2 correction is set to 1F) are set to 1.

Then, in step S33, it is determined whether all of the 12 PI rows of the sector that contains an error have been processed. If the processing of all of the PI rows has not been completed, the process goes to step 34, in which the next PI row is selected. Then, in step S31, the same processing as described above is performed on the newly selected PI row.

In step S33, if the processing on all of the PI rows (12) of that sector has been completed, the processing in step S26 is carried out. In step S26, the main data is outputted along with the interpolation flags.

In step S31, the correction count of the PI2 correction not being 1F indicates an error, but no erroneous correction. Namely, in this case, the flags are reliable, so that the process goes to step S35, where the result of the AND operation between the PO flag and the PI2 flag is set to the interpolation flags of the main data of that PI row.

In particular, in step S32, all of the interpolation flags of that PI row are set to 1. In step S35, since the PO flag and the PI2 flag are reliable, the result of the AND operation between these flags is used as the interpolation flags. The main data outputted with the interpolation flags is interpolated in the subsequent stage if the interpolation flags are set to 1. If the interpolation flags are set in accordance with the processing of step S35, only the data actually having an error is interpolated, such that the error-free data is used as it is.

Then, the processing operation transitions from step S35 to step S33, where it is determined whether all of the PI rows of that sector have been processed. If at least one PI row is not processed, a new PI row is selected in step S34 and then, in step S31, the same processing as above is performed on the newly selected PI row.

According to the above-mentioned preferred embodiment, executing the erasure correction based on the error flag generated in accordance with the ECC correction result enhances the error correction capability. Further, by transferring the decoded data along with the error flag for each byte of the decoded data based on the error flag of each series to the decoding apparatus 14 and 16 (FIG. 33) allows the error data to be interpolated.

Namely, in the case of data for which the error interpolation is not proper as with the TOC data, the error correcting mode can be set such that the probability of the erroneous correction is lowered. Also, in the case of data that can be interpolated as with audio data and image data, the error correcting mode can be set such that the probability of making errors uncorrectable is lowered and the probability of dropping the error detection is suppressed. This setup can execute, on a sector basis, the error correction that matches the nature of the data recorded in each sector.

In the present embodiment, the descramble processing, the EDC check, and the output condition determination are performed in the OCTL circuit 39. It will be appreciated that the control for outputting the error-corrected data satisfying the output condition according to a transfer request from the multiplexed data separating circuit 8 can also be performed by another circuit.

It will also be appreciated that, before the ECC control circuit 36 executes the PI2 correction, this correction may be executed on only the sector data requested for output, by referring to the bits 4 and 5 (FIG. 13) of the sector information. The data that is not requested for output via the bits 4 and 5 may be skipped by using the read pointer of the ring buffer control circuit 6. That is, when transferring data from the ring buffer memory 7 (RAM 37) to the OCTL circuit 39, only the data requested for output from the OCTL circuit 39 may be selected by using the read pointer, as described above.

In the above-mentioned embodiment, the correction processing in the column direction (the PO correction) is performed once, while in the row direction (the PI1 correction and PI2 correction) twice. It will be appreciated that the present invention is not limited to this arrangement, and the correction processing may be performed more times in each direction than the above representative numbers.

According to the decoding apparatus and method as described above, data to be decoded is stored, an error correction is performed on the stored data in row and column directions, a first flag is generated according to the result of the error correction in the row direction, and a second flag is generated according to the result of the error correction in the column direction. This eliminates the necessity for immediately generating interpolation flags, thereby allowing the interpolation flag generating operations to be changed on a unit basis that is smaller than the error correction processing unit, such as the ECC block.

In addition, in accordance with the present invention, the interpolation flags are stored as bytes, thereby reducing the size of memory for storing the interpolation flags and lowering the cost of the decoding apparatus.

While the preferred embodiments of the present invention have been described using specific terms, such description is for illustrative purposes only, and it is to be understood that changes and variations may be made without departing from the spirit or scope of the appended claims.

What is claimed is:

1. Apparatus for decoding encoded data, comprising:

storage means for storing said encoded data arranged in rows and columns;

error correcting means for performing an error correction operation on the stored data along each of said rows and columns;

first flag generating means for generating a first flag that indicates whether there is an error in a respective row, wherein said first flag is based on a result of said error correction operation along said respective row;

second flag generating means for generating a second flag that indicates whether there is an error in a respective column, wherein said second flag is based on a result of said error correction operation along said respective column; and interpolation flag generating means for generating an interpolation flag based on said first and second flags, wherein said interpolation flag generating means generates said interpolation flag for each predetermined data unit forming said encoded data.

2. Apparatus according to claim 1, wherein said first flag generating means generates said first flag a second time if said error correcting means has performed a second error correction operation, wherein said first flag that is generated the second time is based on a result of said second error correction operation along said respective row.

3. Apparatus according to claim 1, wherein said interpolation flag generating means selectively generates said interpolation flag as a function of one of a logical conjunction operation (AND) and a logical disjunction operation (OR) that have been selectively performed between said first flag and said second flag.

4. Apparatus according to claim 1, wherein said interpolation flag generating means generates said interpolation flag based on a result of said error correction operation.

5. Apparatus according to claim 1, further comprising flag storing means for storing said first and second flags.

6. A method for decoding encoded data, comprising the steps of:

storing said encoded data arranged in rows and columns;

performing an error correction operation on the stored data along each of said rows and columns;

generating a first flag that indicates whether there is an error in a respective row, wherein said first flag is based on a result of said error correction operation along said respective row;

generating a second flag that indicates whether there is an error in a respective column, wherein said second flag is based on a result of said error correction operation along said respective column; and generating an interpolation flag based on said first and second flags, wherein said interpolation flag is generated for each predetermined data unit of said encoded data.

7. The method according to claim 6, further comprising generating said first flag a second time if a second error correction operation has been performed, wherein said first flag generated the second time is based on a result of said second error correction operation along said respective row.

8. The method according to claim 6, wherein said interpolation flag is selectively generated as a function of one of a logical conjunction operation (AND) and a logical disjunction operation (OR) that have been selectively performed between said first flag and said second flag.

9. The method according to claim 6, wherein said interpolation flag is generated on the basis of a result of said error correction operation.

10. The method according to claim 6, further comprising storing said first and second flags in flag storing means.

* * * * *